United States Patent [19]
Margolin

[11] Patent Number: 6,023,278
[45] Date of Patent: Feb. 8, 2000

[54] DIGITAL MAP GENERATOR AND DISPLAY SYSTEM

[76] Inventor: Jed Margolin, 3570 Pleasant Echo, San Jose, Calif. 95148

[21] Appl. No.: 08/944,366

[22] Filed: Oct. 6, 1997

Related U.S. Application Data

[63] Continuation of application No. 08/543,590, Oct. 16, 1995, abandoned.

[51] Int. Cl.$^7$ ...................................................... G06T 1/00
[52] U.S. Cl. ............................................. 345/419; 341/94
[58] Field of Search ..................................... 345/418, 419, 345/425, 426, 427; 341/94; 340/995; 463/30–33

[56] References Cited

U.S. PATENT DOCUMENTS

| | | | |
|---|---|---|---|
| 4,660,157 | 4/1987 | Beckwith et al. ........................ | 395/121 |
| 4,970,682 | 11/1990 | Beckwith, Jr. et al. ................. | 395/601 |
| 5,005,148 | 4/1991 | Behensky et al. ........................ | 364/578 |
| 5,140,532 | 8/1992 | Beckwith, Jr. et al. ................. | 395/101 |
| 5,179,638 | 1/1993 | Dawson et al. .......................... | 395/125 |
| 5,299,300 | 3/1994 | Femal et al. ............................. | 395/128 |
| 5,367,615 | 11/1994 | Economy et al. ........................ | 395/129 |
| 5,371,840 | 12/1994 | Fischer et al. ........................... | 395/133 |
| 5,561,746 | 10/1996 | Murata et al. ............................ | 395/119 |
| 5,566,073 | 10/1996 | Margolin ................................... | 364/449 |
| 5,577,960 | 11/1996 | Sasaki ....................................... | 463/32 |
| 5,590,248 | 12/1996 | Zarge et al. .............................. | 395/121 |

OTHER PUBLICATIONS

U.S. Department of the Interior, U.S. Geological Survey, Earth Science Information Center (ESIC) Menlo Park, CA., Sales brochure for US GeoData Digital Elevation Models. Jun. 1993.

U.S. Department of the Interior, U.S. Geological Survey, Earth Science Information Center (ESIC) Menlo Park, CA., Sales brochure for "US GeoData Digital Line Graphs". Jun. 1993.

Ulrich, "Tactical Mapping in Combat Aircraft," IEEE 1988, pp. 74–78.

Raymer et al.,"Advanced Terrain Data Processor," IEEE 1994, pp. 636–639.

Patrick et al., "ITARS Robust Demonstration System Integration," IEEE 1988, pp. 83–87.

Jacobs et al., "Fractal Image Compression Using Iterated Transforms: Applications to DTED," IEEE 1994, pp. 1122–1128.

*Primary Examiner*—Joseph H. Feild
*Attorney, Agent, or Firm*—Blakely, Sokoloff, Taylor & Zafman

[57] ABSTRACT

A digital map system for displaying three dimensional terrain data uses terrain data in the form of polygons. The polygon database is produced from a database of elevation points which are divided into, for example, n×n (where n is a positive integer) squares which have an elevation point in the center of the square. The center point forms four polygons with the corners of the square. The elevation of the center point may be chosen to be the highest elevation point in the n×n square, the average elevation of the elevation points in the n×n square, the elevation of the actual center point, or other methods. The method chosen depends on how the data base is to be used. The size of the n×n square chosen also depends on how the data base is to be used since there is a tradeoff between the resolution of the displayed scene and the amount of data reduction from the original database of elevation points. The polygon database may be used in a pilot aid using a synthetic environment, a flight simulator, as part of the control system for a remotely piloted vehicle, or in a video game.

33 Claims, 22 Drawing Sheets

Hidden Line Algorithm    Side View

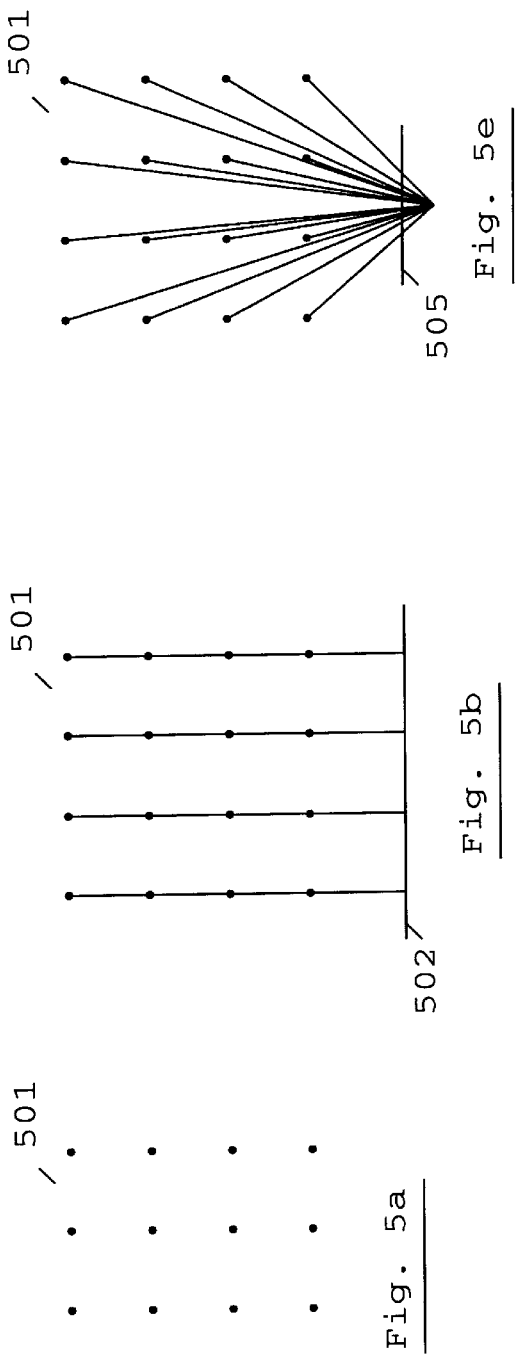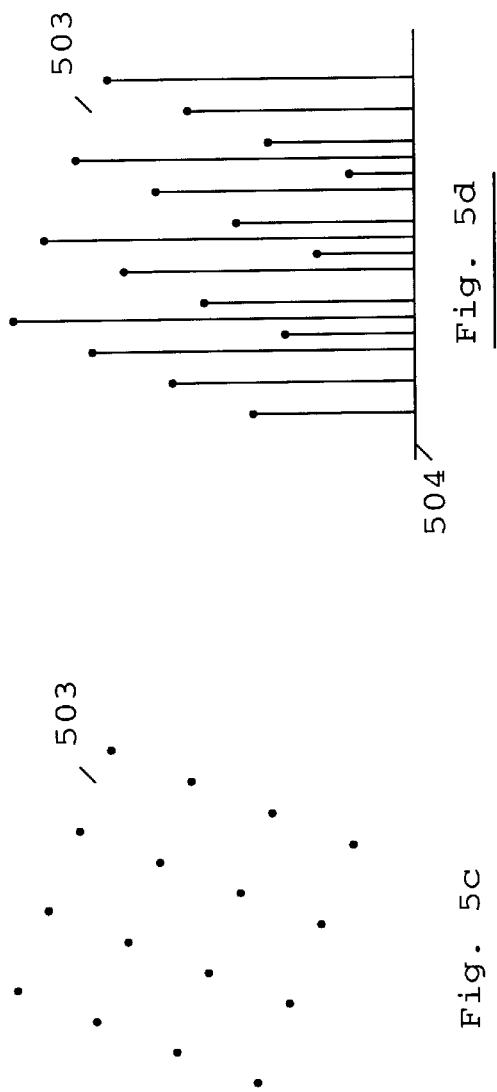

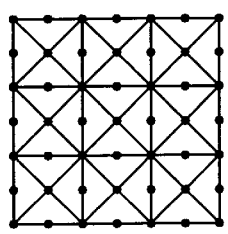
Fig. 6a
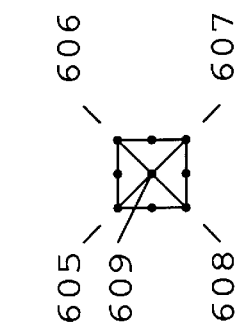
Fig. 6b
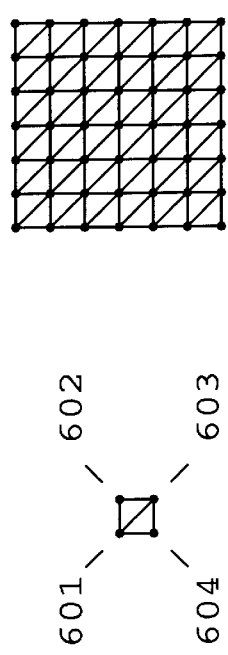
Fig. 6c
Fig. 6d
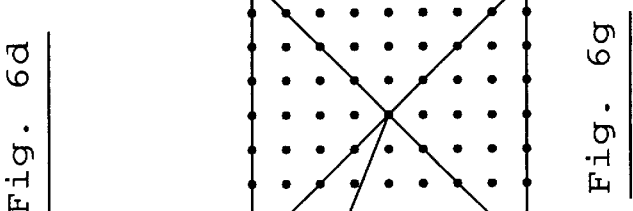
Fig. 6e
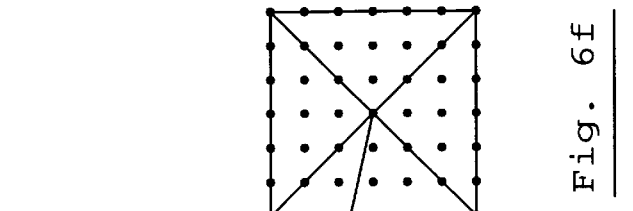
Fig. 6f
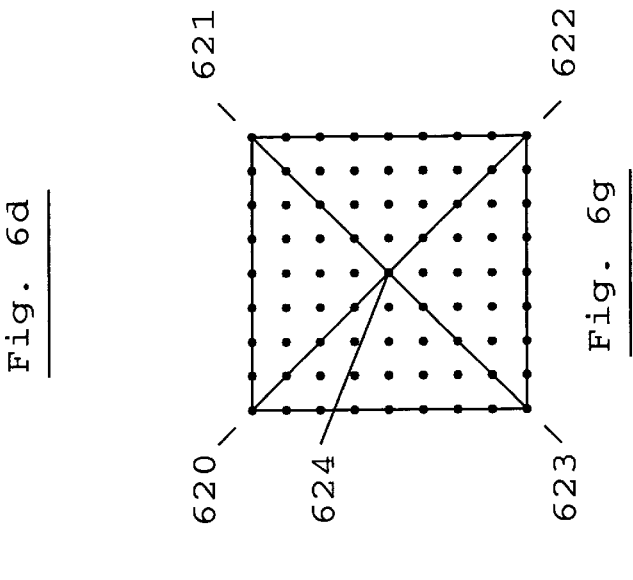
Fig. 6g
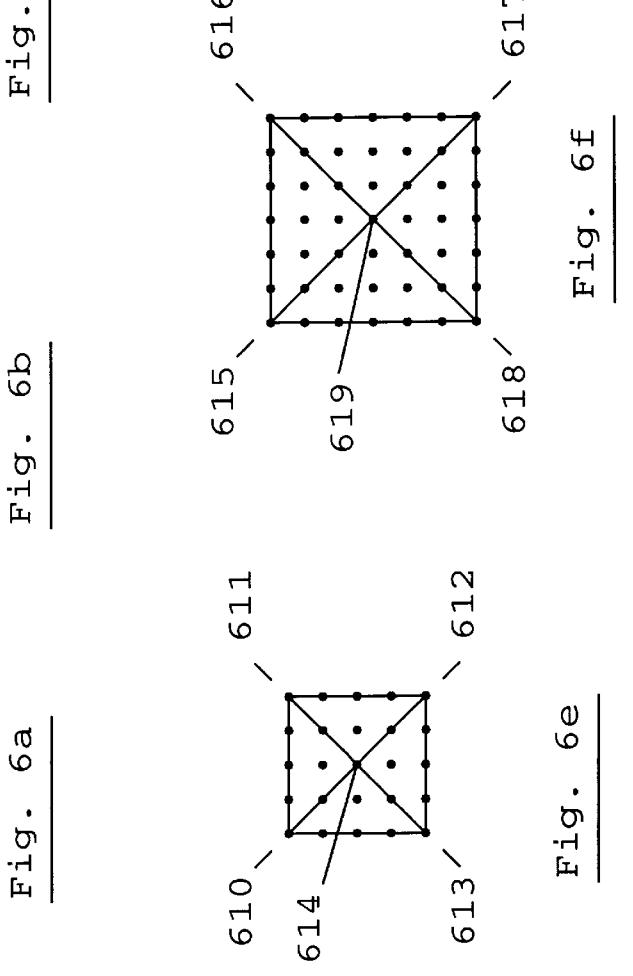

Perspective Projection
Polygons    Size = 1:4     Data = 1:8

Orthographic Projection   Yaw = 0 degrees
Polygons        Size = 1:4    Data = 1:8

```
Orthographic Projection    Yaw = 23.5 degrees
Polygons    Size = 1:8     Data = 1:32

```

Orthographic Projection    Yaw = 23.5 degrees
Polygons    Size = 1:8    Data = 1:32

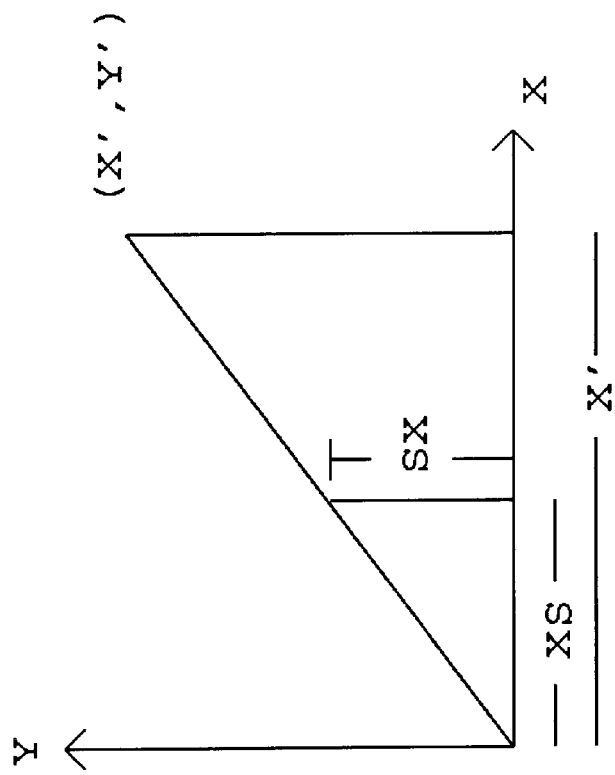
Fig. 16b    Top
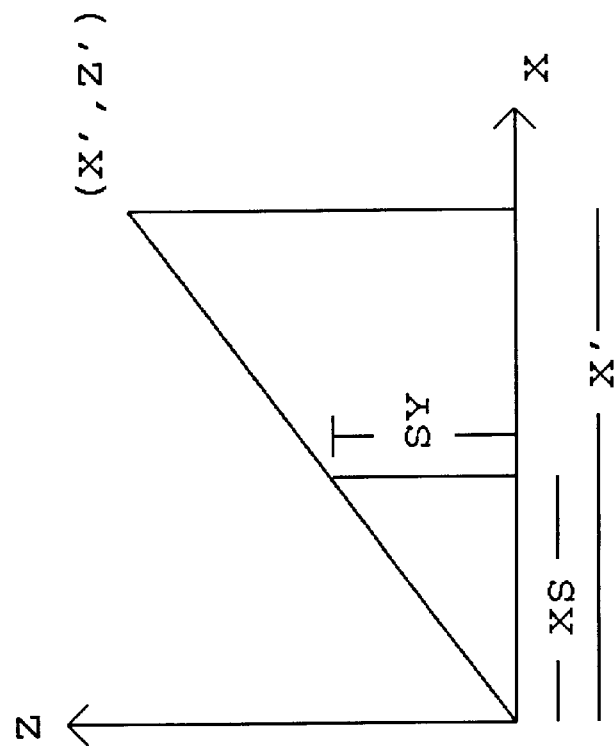
Fig. 16a    Side

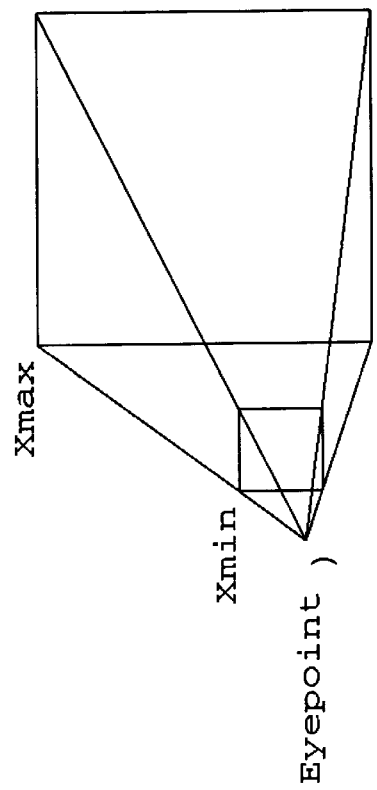
Fig. 17a
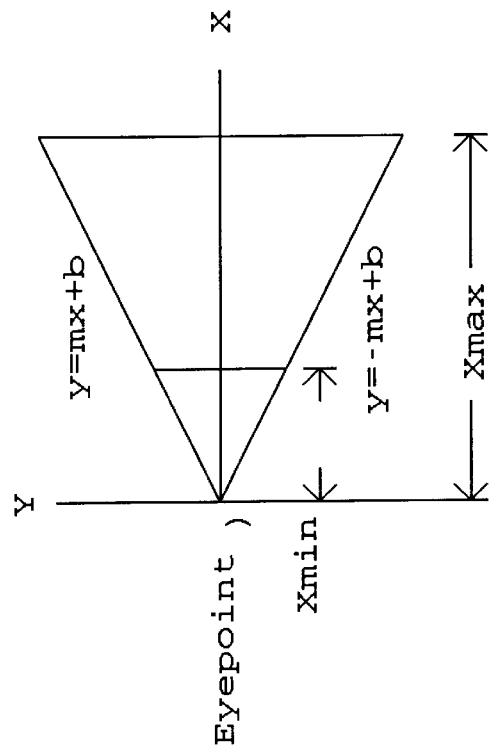
Fig. 17b  Top View
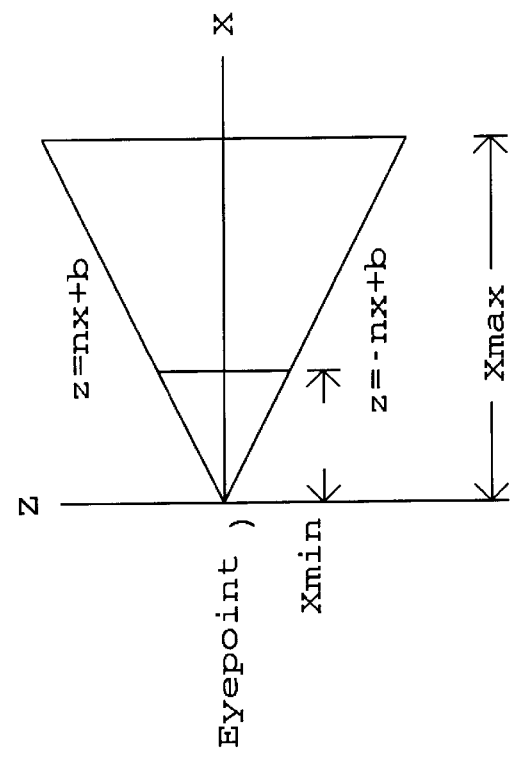
Fig. 17c  Side View

|    |    |    |
|----|----|----|
| 33 | 32 | 31 |
| 23 | 22 ← | 21 |
| 13 | 12 | 11 |

Fig. 19b

|    |    |    |
|----|----|----|
| 32 | 31 | 30 |
| 22 | 21 ← | 20 |
| 12 | 11 | 10 |

Fig. 19a

| 33 | 32 | 31 |
|---|---|---|
| 23 | 22 ↑ | 21 |
| 13 | 12 | 11 |

Fig. 20a

| 43 | 42 | 41 |
|---|---|---|
| 33 | 32 ↑ | 31 |
| 23 | 22 | 21 |

Fig. 20b

DIGITAL MAP GENERATOR AND DISPLAY SYSTEM

This is a continuation of application Ser. No. 08/543,590, filed Oct. 16, 1995, now abandoned.

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Field of the Invention

This invention relates to a digital map system for displaying three dimensional terrain data. The terrain data is in the form of polygons and is produced from a database of elevation points.

2. Art Background

Systems using elevation data directly have been developed that present an apparent three-dimensional effect as well as some that present a mathematically correct texture-mapped three-dimensional projected display. Both of these systems require a very large amount of storage for terrain data. The latter system also requires specialized hardware. Their high cost has limited their use to military aviation.

The 1992 patent to Beckwith et al. (U.S. Pat. No. 5,140,532) provides a topographical two-dimensional real-time display of the terrain over which the aircraft is passing, and a slope-shading technique incorporated into the system provides to the display an apparent three-dimensional effect similar to that provided by a relief map. This is accomplished by reading compressed terrain data from a cassette tape in a controlled manner based on the instantaneous geographical location of the aircraft as provided by the aircraft navigational computer system, reconstructing the compressed data by suitable processing and writing the reconstructed data into a scene memory with a north-up orientation. A read control circuit then controls the read-out of data from the scene memory with a heading-up orientation to provide a real-time display of the terrain over which the aircraft is passing. A symbol at the center of display position depicts the location of the aircraft with respect to the terrain, permitting the pilot to navigate the aircraft even under conditions of poor visibility. However, the display provided by this system is in the form of a moving map rather than a true perspective display of the terrain as it would appear to the pilot through the window of the aircraft.

The 1987 patent to Beckwith et al. (U.S. Pat. No. 4,660,157) is similar to U.S. Pat. No. 5,140,532. It also reads compressed terrain data from a cassette tape in a controlled manner based on the instantaneous geographical location of the aircraft as provided by the aircraft navigational computer system and reconstructs the compressed data by suitable processing and writing the reconstructed data into a scene memory. However, instead of providing a topographical two-dimensional display of the terrain over which the aircraft is passing and using a slope-shading technique to provide an apparent three-dimensional effect similar to that provided by a relief map as shown in the '532 patent, the '157 patent processes the data to provide a 3D perspective on the display. There are a number of differences between the '157 patent and the present invention, including the following:

1. The '157 patent stores the map as a collection of terrain points with associated altitudes; the large amount of storage required by this approach requires that a tape be prepared for each mission. The present invention uses a reduced number of elevation points representing polygons which results in a reduction of data base storage so that larger geographic areas can be stored so that it is not necessary to generate a data base for each mission.

2. The '157 patent uses a tape cassette for data base storage; the long access time for tape storage makes it necessary to use a relatively large cache memory. The present invention uses a CD-ROM which permits random access to the data so that the requirements for cache storage are reduced.

3. The '157 patent accounts for the aircraft's heading by controlling the way the data is read out from the tape. Different heading angles result in the data being read from a different sequence of addresses. Since addresses exist only at discrete locations, the truncation of address locations causes an unavoidable change in the map shapes as the aircraft changes heading. The present invention stores terrain as polygons which are mathematically rotated as the aircraft changes attitude. The resolution is determined by number of bits used to represent the vertices of the polygons, not the number of storage addresses.

4. The '157 patent accounts for the roll attitude of the aircraft by mathematically rotating the screen data after it is projected. The '157 patent does not show the display being responsive to the pitch angle of the aircraft. In systems such as this the lack of fidelity is apparent to the user. People know what things are supposed to look like and how they are supposed to change perspective when they move. The present invention uses techniques to perform the mathematically correct transformation and projection.

The 1991 patent to Behensky et al. (U.S. Pat. No. 5,005,148) shows a driving simulator for a video game. The road and other terrain are produced by mathematically transforming a three-dimensional polygon data base. The data base does not represent real terrain but rather is created to meet the specific needs of the game. The creation of this database is very labor intensive.

The 1993 patent to Dawson et al. (U.S. Pat. No. 5,179,638) shows a method and apparatus for providing a texture mapped perspective view for digital map systems which includes a geometry engine that receives the elevation posts scanned from the cache memory by the shape address generator. A tiling engine is then used to transform the elevation posts into three-dimensional polygons. One important difference between the '638 patent and the present invention is that the '638 patent stores the map as a large number of terrain points with associated altitudes, thereby requiring a large amount of data storage. The present invention uses a reduced number of elevation points representing polygons which results in a reduction of data base storage.

Also, because the '638 patent uses a large number of texture mapped polygons it requires expensive custom hardware that restricts its use to military applications. The present invention uses a reduced number of elevation points representing polygons and can be implemented with standard commercially available hardware which allows it to be used in more cost sensitive applications such as in general aviation and video games.

The sales brochure from the U.S. Geological Survey shows the availability of Digital Elevation Models for all of the United States and its territories.

The second sales brochure from the U.S. Geological Survey shows the availability of Digital Line Graph Models for all of the United States and its territories. The data includes: political and administrative boundaries; hydrography consisting of all flowing water, standing water, and wetlands; major transportation systems consisting of roads and trails, railroads, pipelines, transmission lines, and airports; and significant manmade structures.

Accordingly, several objects and advantages of my invention are to provide a digital map system that produces a mathematically correct three-dimensional projected view of the terrain while reducing the amount of storage required for the data base and which can be accomplished by using standard commercially available components. The invention can be used in a pilot aid during a flight, in a flight simulator, as part of the control system for a remotely piloted vehicle, or in a video game.

Further objects and advantages of my invention will become apparent from a consideration of the drawings and ensuing description.

SUMMARY OF THE INVENTION

The present invention is a method for producing a digital map database to be used in a system for displaying three dimensional terrain data. The terrain database uses a reduced number of elevation points representing polygons, resulting in a reduction of database storage requirements.

BRIEF DESCRIPTION OF THE DRAWINGS

FIG. 5a and FIG. 5b show how hidden points can be removed using the hidden line algorithm.

FIG. 5c and FIG. 5d show why the hidden line algorithm cannot be used to remove hidden points when the viewpoint is not along an axis.

FIG. 5e shows why the hidden line algorithm cannot be used to remove hidden points for a perspective projection of the points.

FIG. 6a through FIG. 6g show exemplary methods used to create polygons from a database of elevation points.

FIG. 7 is a picture of a perspective projection of a representative database comprising polygons produced from a database of digital elevation points produced from the method shown in FIG. 6a.

FIG. 16a is a side view showing the projection of a point in three-dimensions projected onto a two-dimensional screen.

FIG. 16b is a top view showing the projection of a point in three-dimensions projected onto a two-dimensional screen.

FIG. 17a is an orthographic projected three-dimensional representation of the viewing pyramid.

FIG. 17b is a 2D top view of the viewing pyramid.

FIG. 17c is a 2D side view of the viewing pyramid.

FIG. 19a shows the impending crossover from Geographic Data Block 21 to Geographic Data Block 22.

FIG. 19b shows the result of a crossover from Geographic Data Block 21 to Geographic Data Block 22.

FIG. 20a shows the impending crossover from Geographic Data Block 22 to Geographic Data Block 32.

FIG. 20b shows the result of a crossover from Geographic Data Block 22 to Geographic Data Block 32.

DETAILED DESCRIPTION OF THE INVENTION

A method of generating a database is described. In the following description, numerous specific details are set forth such as specific systems, steps, techniques, etc., in order to provide a thorough understanding of the present invention. However, it will be obvious to one of skill in the art that the invention may be practiced without these specific details. In other instances, well known elements and techniques have not been shown in particular detail in order to avoid unnecessarily obscuring the present invention.

The Database

The U.S. Geological Survey (USGS) has available a database called the Digital Elevation Model (DEM) which consists of an array of regularly spaced terrain elevations. The array includes elevation points arranged horizontally on the Universal Transverse Mercator, stored as profiles. The spacing of the elevation points along and between each profile may be, for example, 30 meters. It can be purchased on 9 track tape or it can be downloaded from the USGS ftp site on the Internet. The data used as an example to illustrate the present invention is from the SEATTLE-E DEM file downloaded from the USGS ftp site. For the purposes of illustration the elevation values are exaggerated by a factor of approximately 30 X. Although the DEM data is used to illustrate the present invention, it will be appreciated that any database consisting of similar data may be used.

Figure 1:
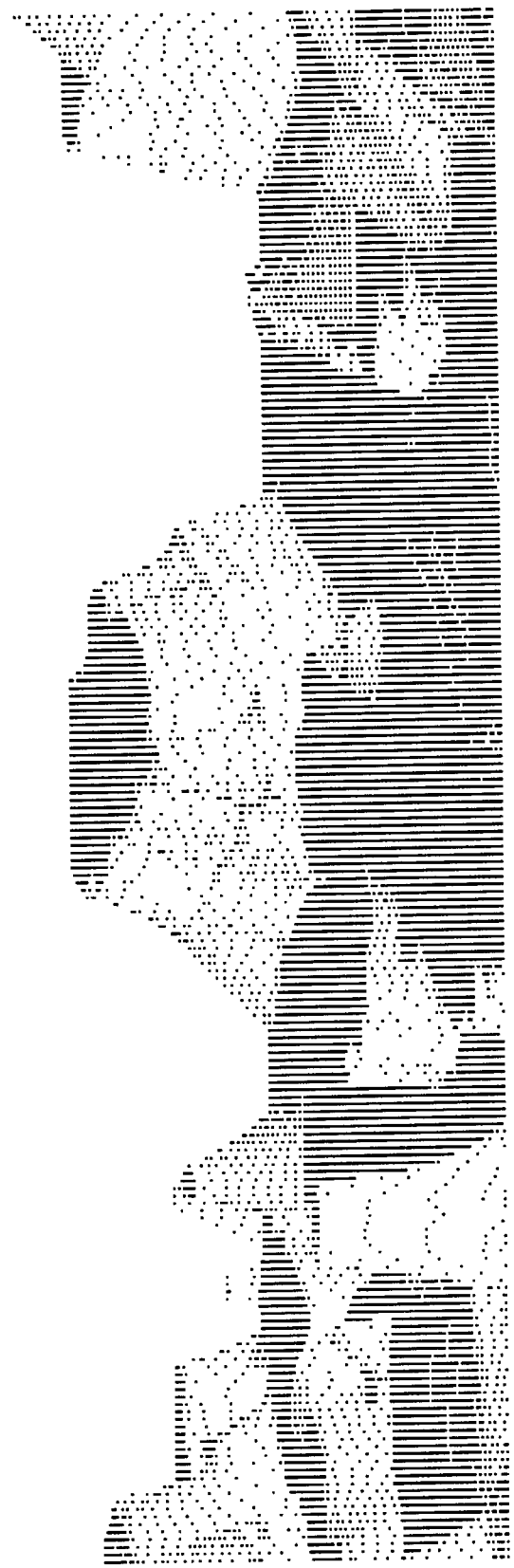
FIG. 1 is a picture of an orthographic projection of a representative database consisting of digital elevation points, with a yaw angle of 0 degrees, with hidden points removed.
Figure 4:
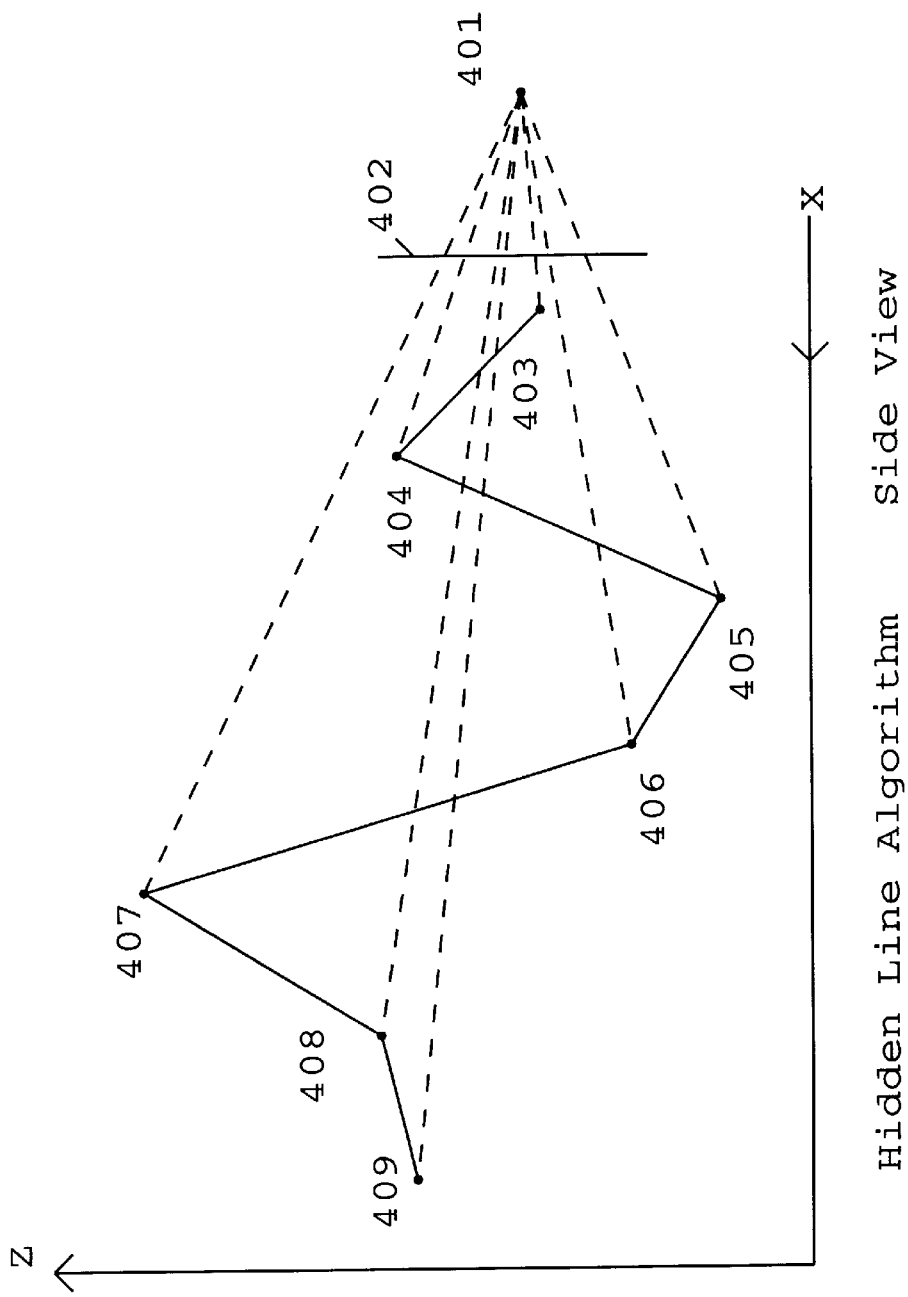
FIG. 4 shows how hidden points can be removed using a hidden line algorithm.

FIG. 1 shows an orthographic projection of a 256×256 section of the SEATTLE-E DEM. Because the projection is orthogonal, with no yaw angle, a hidden line algorithm was used to remove hidden points. The hidden line algorithm is shown in FIG. 4. The hidden line algorithm looks at a two dimensional slice of the terrain. Moving outward from a point at which an observer is located, a point on the terrain remains if it is at a higher elevation than all points between it and the observer. A point on the terrain is removed if it is at a lower elevation than any point between it and the observer. For example, in FIG. 4 the observer is at point 401 and the points are projected onto screen 402. Point 403 is the closest point and therefore is visible. The projection of Point 404 is higher on the screen than point 403 and is therefore also visible. This point 404 becomes the new standard for comparing succeeding points. The projection of point 405 is lower than the projection of point 404 so it is hidden and not displayed. The projection of point 406 is also lower than the projection of point 404 so it is also hidden. The projection of point 407 is higher than the projection of point 404 so it is visible and becomes the new standard for comparison. Points 408 and 409 are therefore also hidden.

This method produces an acceptable quality picture but it only works if we are looking directly down a row or a column of the data. If we are not looking directly down a row or a column the result is FIG. 2, where we have rotated the view by 23.5 degrees around the yaw axis. The reason we cannot use the hidden line algorithm is shown in FIG. 5a through FIG. 5e. The array of points 501 shown in FIG. 5a is shown in FIG. 5b during an orthogonal projection onto screen 502. The points line up down the column so the hidden line algorithm can be used. However if the points are rotated as in the array of points 503 shown in FIG. 5c, when they are projected in FIG. 5d onto screen 504 the points do not line up and there is no easy way to determine whether a point should be hidden because there are no surfaces in a point array. FIG. 5e shows that for a perspective projection of a point array onto screen 505, the hidden line algorithm cannot be used in this situation as well. FIG. 3 shows the result of viewing a perspective projection of the scene presented in FIG. 1.

One method for improving the picture quality is to use the elevation points as the vertices of three dimensional polygons. In a preferred embodiment, triangles are used. This allows hidden surfaces to be removed using mathematics that is well known in the computer graphics and video game industries. FIG. 6a shows how the elevation points are formed into three dimensional triangles. Triangles are used in a preferred embodiment because three points define a plane so that each triangle is guaranteed to be flat. If a polygon having more than three vertices is used, there is no guarantee that all points would be in the same plane. In an embodiment using polygons with more than three vertices, the elevation points may be adjusted using a known fit routine so that the polygon defines a plane. This embodiment may be used in situations where it is acceptable to alter the appearance of the actual terrain. Each typical cell, composed of points 601, 602, 603, and 604, makes two triangles. The first triangle is composed of points 601, 603, and 604. The second triangle is composed of points 601, 602, and 603. FIG. 6b shows a number of the cells described in FIG. 6a.

Figure 7:
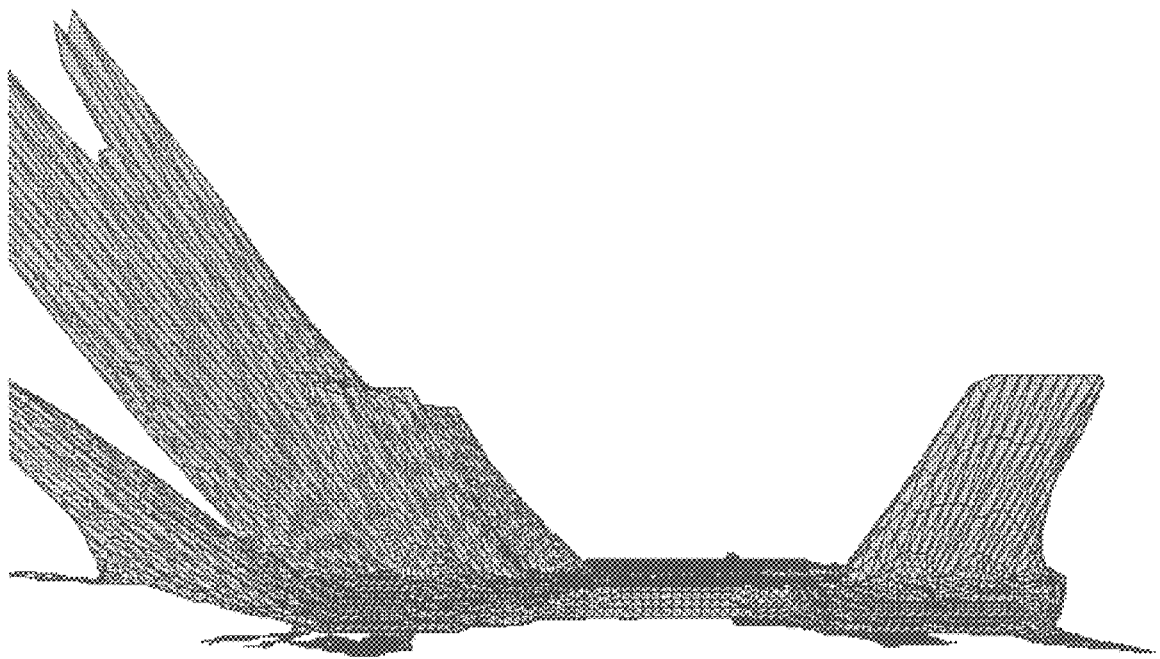

FIG. 7 shows the results of using polygons formed by the method of FIG. 6a. The picture is very detailed. Because there are a large number of polygons, only a small section of the map is shown.

In order to reduce the size of the database the following method is used, as shown in FIG. 6c. A cell is formed by using points 605, 606, 607, and 608. Four three dimensional triangles are formed using the center point 609. Triangle 1 is formed by points 609, 605, and 606. Triangle 2 is formed by points 609, 606, and 607. Triangle 3 is formed by points 609, 607, and 608. Triangle 4 is formed by points 609, 608, and 605. FIG. 6d shows a number of the cells described in FIG. 6c.

This technique reduces the size of the database because there are now ½ the number of columns and ½ the number of rows. However, each column of corner points has associated with it a column of center points, so that the final database size is ½×½×2=½. This is $2/(n*n)$ where n=2.

FIG. 6e shows the cell for n=4. In this case the size of the database is $2/(n*n)=1/8$. Triangle 1 is formed by points 614, 610, and 611. Triangle 2 is formed by points 614, 611, and 612. Triangle 3 is formed by points 614, 612, and 613. Triangle 4 is formed by points 614, 613, and 610.

FIG. 6f shows the cell for n=6. In this case the size of the database is $2/(n*n)=1/18$. Triangle 1 is formed by points 619, 615, and 616. Triangle 2 is formed by points 619, 616, and 617. Triangle 3 is formed by points 619, 617, and 618. Triangle 4 is formed by points 619, 618, and 615.

FIG. 6g shows the cell for n=8. In this case the size of the database is $2/(n*n)=1/32$. Triangle 1 is formed by points 624, 620, and 621. Triangle 2 is formed by points 624, 621, and 622. Triangle 3 is formed by points 624, 622, and 623. Triangle 4 is formed by points 624, 623, and 620.

The elevation of the center point may be set in a number of ways. One method (Method 1) is to set it to the highest elevation of the points in the original cell. Another method (Method 2) is to set it to the average elevation of the points in the original cell. A further method (Method 3) is to set it to the elevation of the actual center point in the original cell. Yet another method (Method 4) is to set it to the average of a subset of the points in the original cell, for example, the average of a predetermined number of points near the center. The method selected is determined by how the database is to be used. One skilled in the art would appreciate that other methods appropriate to the use of the database may be used.

If the database is to be used in a system such as is described in copending application by the present inventor, Ser. No. 08/274,394 filed Jul. 11, 1994, entitled "Pilot Aid Using A Synthetic Environment" it is important to not fly into terrain so that Method 1 (highest) is preferably used.

Although the cell is shown as a pyramid with the high point in the center of the cell, in actuality any part of the terrain within the cell may be that high. The system would be programmed to take this into account in warning the pilot not to fly too close. This warning could be made by flashing the cell as well as by an audible alert.

Figure 8:
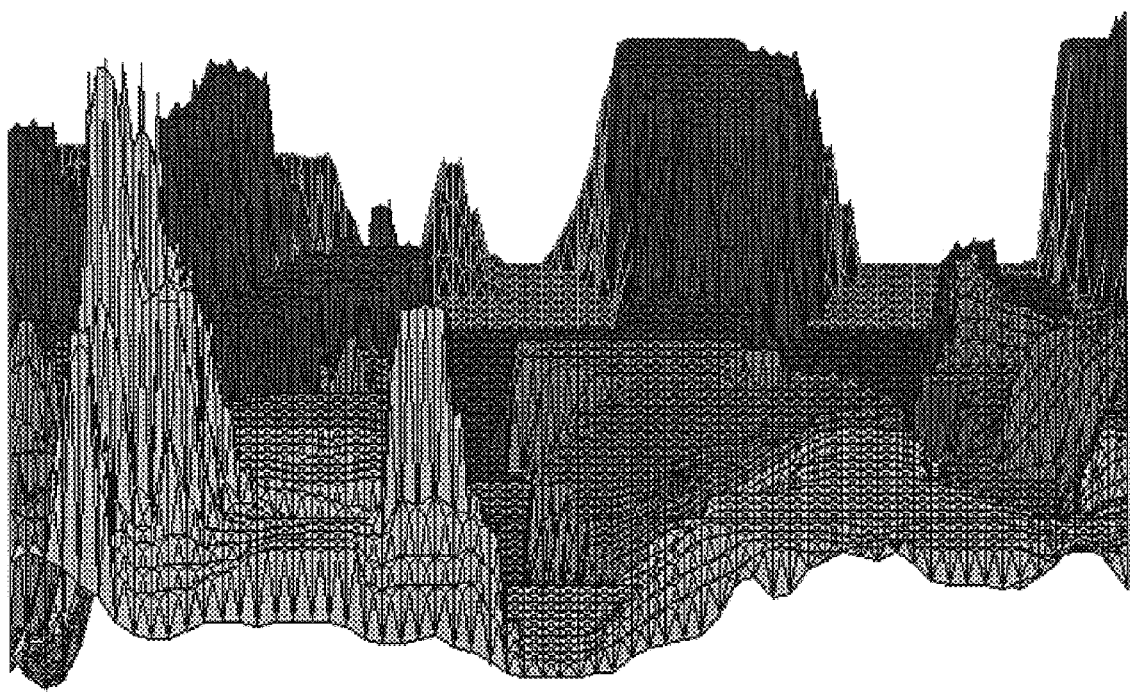
FIG. 8 is a picture of an orthographic projection of a representative database comprising polygons produced from a database of digital elevation points produced from the method shown in FIG. 6e.

An example of a picture produced using the 1:8 data reduction of FIG. 6e is shown in FIG. 8. In order to compare it to the point display in FIG. 1, Orthographic projection is used, with a yaw angle of 0 degrees. The center point is selected by Method 1 (highest). As used herein, a data reduction of 1:n means that the number of data points required to produce the projection according to the present invention is 1/n times the number of data points for the corresponding type of projection using the elevation points directly. Thus, for example, the orthographic projection of FIG. 6 requires ⅛ the data points of the prior art orthographic projection of the same terrain shown in FIG. 1.

Figure 9:
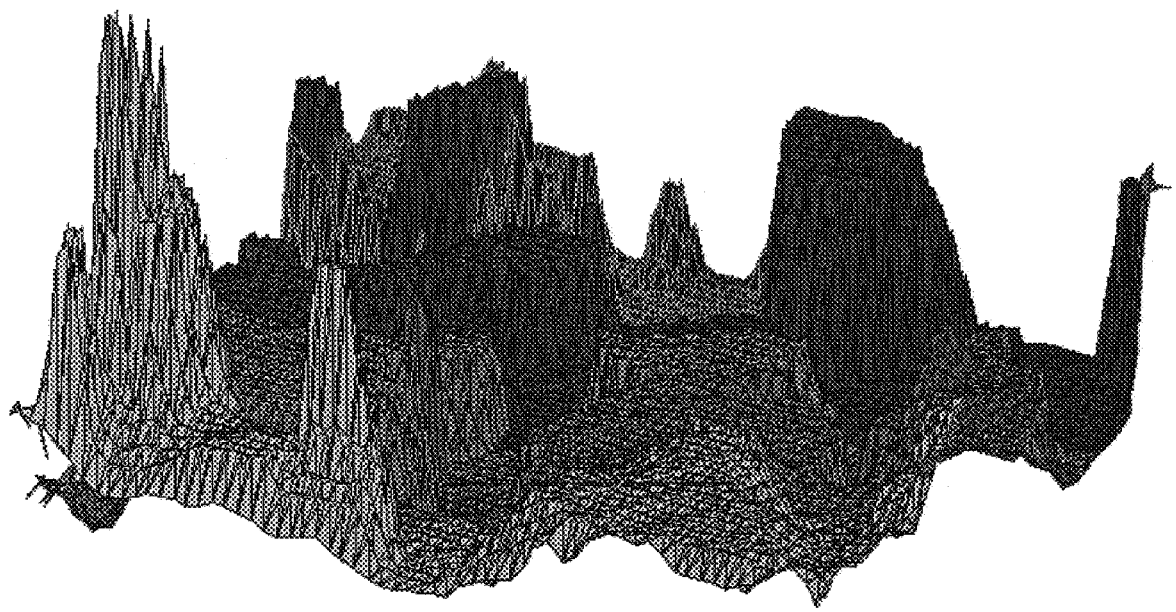
FIG. 9 is another picture of an orthographic projection of a representative database comprising polygons produced from a database of digital elevation points produced from the method shown in FIG. 6e.

Another example of a picture produced using the 1:8 data reduction of FIG. 6e is shown in FIG. 9. In order to compare it to the point display in FIG. 2, Orthographic projection is used, with a yaw angle of 23.5 degrees. The center point is selected by Method 1 (highest).

Figure 10:
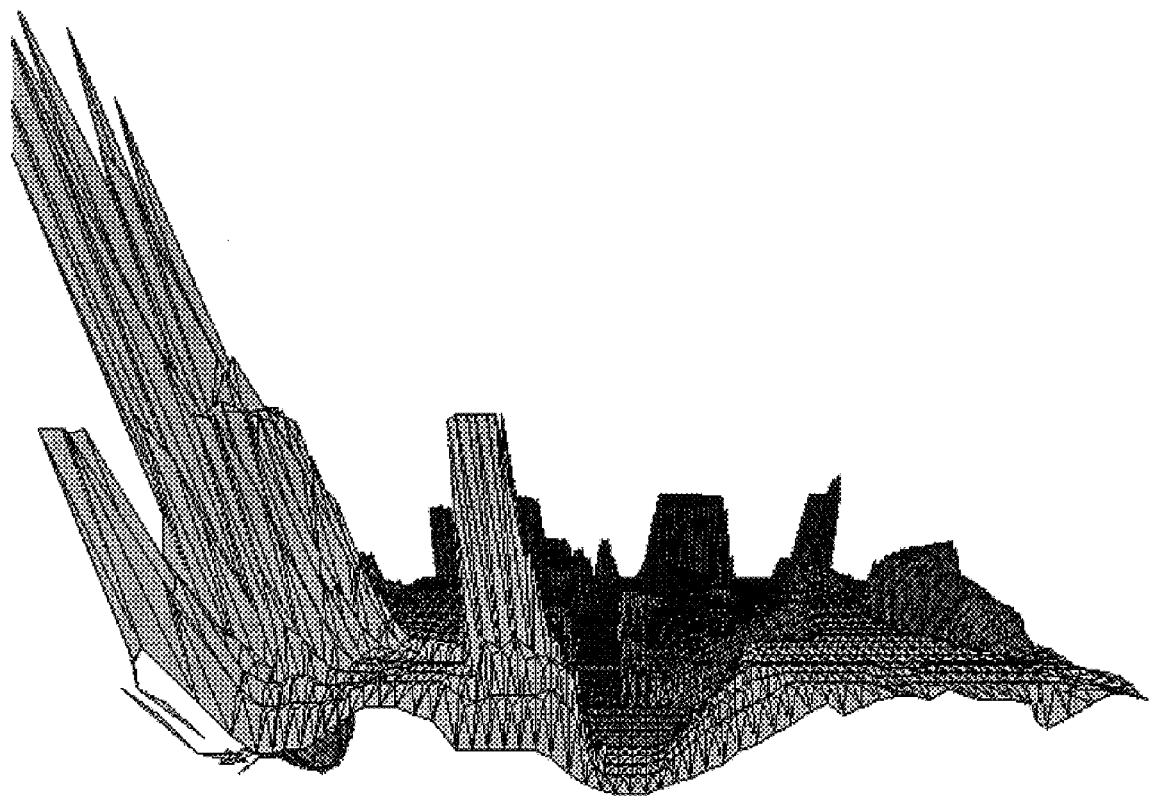
FIG. 10 is a picture of a perspective projection of a representative database comprising polygons produced from a database of digital elevation points produced from the method shown in FIG. 6e.

Another example of a picture produced using the 1:8 data reduction of FIG. 6e is shown in FIG. 10. In order to compare it to the point display in FIG. 3, Perspective projection is used, with a yaw angle of 0 degrees. The center point is selected by Method 1 (highest).

Figure 11:
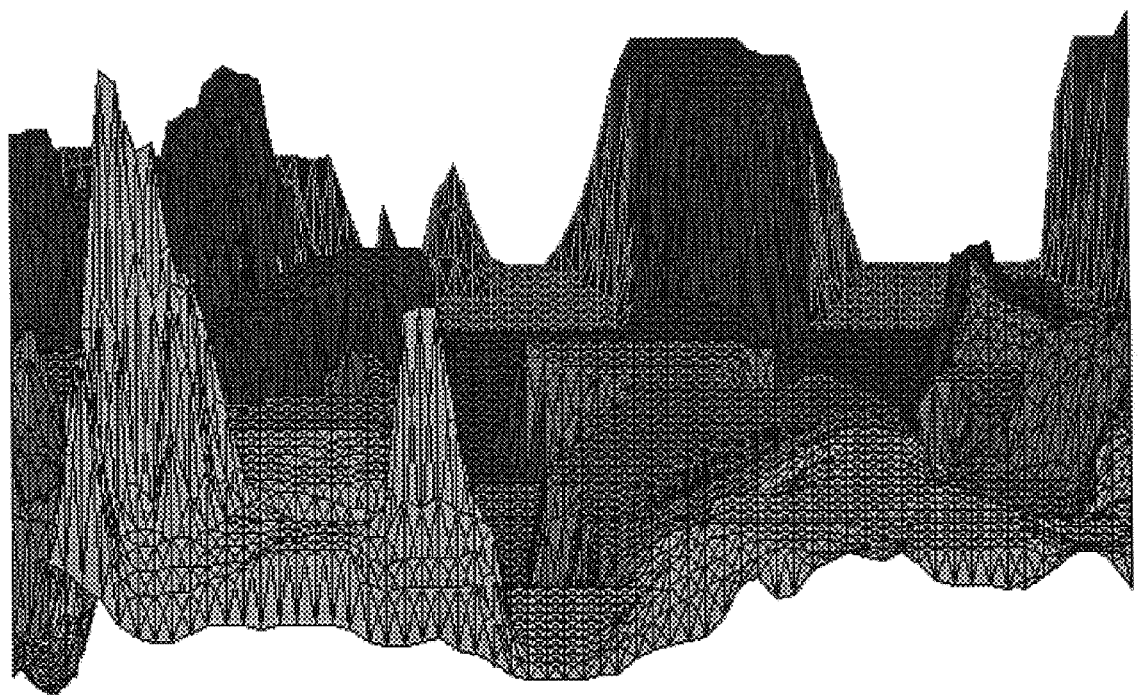
FIG. 11 is a picture of an orthographic projection of a representative database comprising polygons produced from a database of digital elevation points produced from the method shown in FIG. 6e, using a different method for calculating the elevation of the center points from the method used to produce the picture of FIG. 10

FIG. 11 was produced using the 1:8 data reduction of FIG. 6e as shown in FIG. 10. However, in this case Method 2 (average) was used in selecting the center point elevation. Compared to FIG. 8, which uses Method 1 (highest) for selecting the center point elevation, the peaks in FIG. 11 are more regular. Thus, Method 2 (average) would be more appropriate for non-critical applications such as video games.

Figure 12:
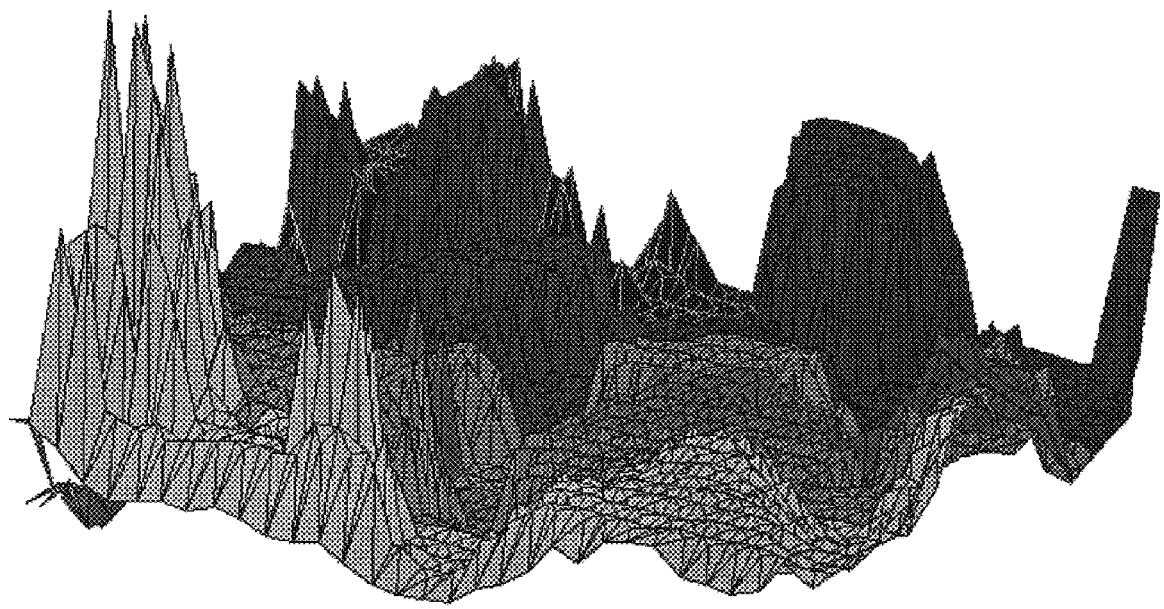
FIG. 12 is a picture of an orthographic projection of a representative database comprising polygons produced from a database of digital elevation points produced from the method shown in FIG. 6g, with the center points set to the elevation of the highest point within each cell.
Figure 13:
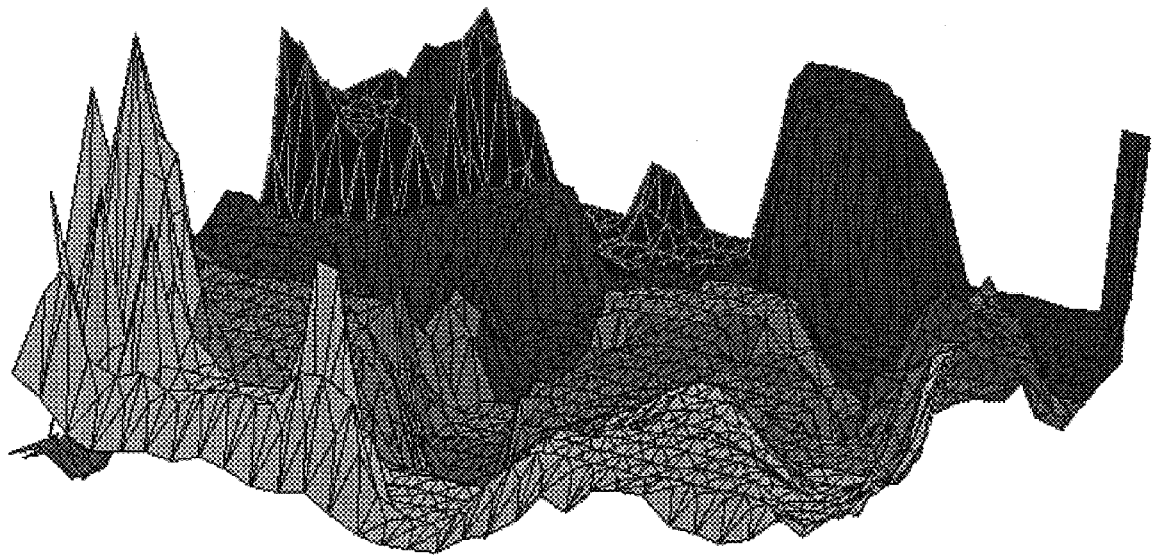
FIG. 13 is a picture of an orthographic projection of a representative database comprising polygons produced from a database of digital elevation points produced from the method shown in FIG. 6g, with the center points set to the average elevation of the elevation points within each cell.

The difference between Method 1 (highest) and Method 2 (average) is shown more clearly in FIG. 12 and FIG. 13, both of which use data reduction of 1:32. The database in FIG. 12 uses Method 1 (highest) while the database in FIG. 13 uses Method 2 (average).

Figure 2:
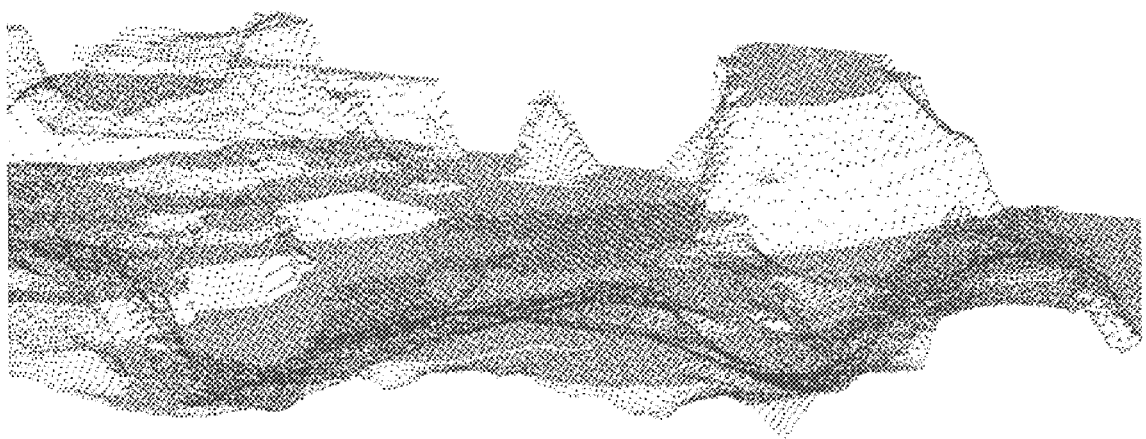
FIG. 2 is a picture of an orthographic projection of a representative database consisting of digital elevation points, with a yaw angle of 23.5 degrees, without hidden points removed.
Figure 3:
FIG. 3 is a picture of a perspective projection of a representative database consisting of digital elevation points, with a yaw angle of 0 degrees, without hidden points removed.

The size of the file for producing FIG. 2 is 128 K bytes. The file size for producing FIG. 9 is 16 K bytes. The file size for producing FIG. 12 is 4 K bytes.

Data Base Reduction

The Digital Elevation Model data elevations are spaced 30 meters apart. 30 meters=30×39.37 in/m×1 ft/12 in=98.245 ft. A linear mile contains 5,280 ft/mi×1 data point/98.245 ft=53.65 data points/mi. Therefore, a square mile contains 53.65×53.65=2878 data points.

California has a total area of 158,706 square miles which requires 158,706×2878=456,755,868 data points. Assuming each elevation point requires 16 bits, this requires 913,511,736 bytes. This is more than would fit on a standard CD Rom disc which stores 650 M bytes.

The U.S. has a total area of 3,618,773 square miles which requires 3,618,773×2878=10,414,828,694 data points, requiring 20,829,657,388 bytes. This would require 32 CD ROM discs.

Using a database reduction of 1:32 as exemplified by FIG. 12, the database for California would require 913,511,736 bytes/32=28,547,242 bytes. The database for the U.S. would require 20,829,657,388 bytes/32=650,926,793 bytes. This is slightly more data than can be put on one CD ROM disc, but it would fit on two CD ROM discs. A system used on an aircraft could have two CD ROM drives. This has the advantage that in the event one drive fails during the flight, the system would continue to operate with the remaining CD ROM drive with the pilot manually swapping the discs at the appropriate time.

After determining the amount of data reduction to be used, the elevation points are stored linearly with a column of corner points followed by a column of center points. The x and y of each point is a function of its position in the file. The z value is the elevation data stored at that address. In the embodiments described above, then, elevation points only in every mth column are stored. When storing one of these mth columns, only every nth point along that column is stored. In essence, the point at the intersection of every mth column and every nth row is stored. It will be appreciated that although square cells have been illustrated above (m=n), in alternative embodiments, the cells need not be square and may be, e.g. rectangular, so that m need not necessarily be equal to n. In such cases, if an actual center point does not fall in the center of the cell, a point near the center may be used. Alternatively, the center point may be defined (in x and y) in the center of any cell created, using an elevation value assigned, by, for example, one of the earlier described methods. It will further be appreciated that different values of m and/or n may be used for different portions of the database. For example, as described below, certain regions may be represented with greater resolution than other regions.

In operation, this data is read by the computer into its memory. The computer, knowing the value of m and n, and the position of the center points, can thus determine the x and y of each point by virtue of the location in memory. Then, using, for example, the methods described in conjunction with FIGS. 6a–6g, polygons may be defined. That is, for example, every pair of adjacent data points (adjacent along a column, such as points 605 and 608 of FIG. 6c, or adjacent along a row, such as points 605 and 606 of FIG. 6c) and the center point (such as point 609 of FIG. 6c) define a polygon. The polygons may then be operated on by standard mathematical transformations used by the computer graphics industry. The mathematical transformations of these and other polygons will be discussed below.

During the creation of the database, the data is organized in geographic blocks. Each geographic block may contain, for example, an amount of data that is sufficient for the use to which the terrain database is put, while remaining of a size such that the system can easily manipulate the data. In operation these geographic blocks are accessed so that there is always the proper data present. For example, for easy manipulation, the data may be broken down into blocks which are smaller than what system memory can handle at one time, so that several blocks can be loaded and discarded as needed. In one embodiment, nine geographic blocks of data are loaded in system memory at any given time. This is shown in FIG. 19a. FIG. 19b shows that when the user crosses from Block 21 to Block 22, the data from Blocks 10, 20, and 30 are discarded and data from Blocks 13, 23, and 33 are brought in from CD ROM Database Database 2105. FIG. 20a and FIG. 20b show the user crossing from Block 22 to Block 32.

Geographic data blocks may use different amounts of compression so that areas of special interest, such as around airports, may be represented in greater detail and therefore with less compression.

For example, if the 20 largest airports in the U.S. were represented as 10 mi×10 mi blocks with no data reduction (1:1), it would require only 20×10×10 ×2878×2=11,512,000 bytes of storage.

Additional Databases

Another USGS database that can be used is the Digital Line Graph data which includes: political and administrative boundaries; hydrography consisting of all flowing water, standing water, and wetlands; major transportation systems consisting of roads and trails, railroads, pipelines, transmission lines, and airports; and significant manmade structures. The Digital Line Graph data is two-dimensional. In the present invention features such as water, roads, railroads, and pipelines are represented as polygons with elevations determined from the Digital Elevation Model data. Transmission lines and significant manmade structures are defined as three-dimensional objects made of polygons and are placed according to the elevations determined from the Digital Elevation Model data. The different types of objects are tagged so that the user can select them to be highlighted by category or by specific object. For example, the user can choose to have all airports highlighted or just the destination airport. The user can also choose to have a specific highway highlighted.

Data from additional digital data bases can also be incorporated. An example of such a data base is from Jeppesen Sanderson whose NavData Services division provides aeronautical charts and makes this information available in digital form.

An Application

A useful application for the present invention is with a system such as is described in the above-referenced copending application by the present inventor "Pilot Aid Using A Synthetic Environment".

Figure 21:
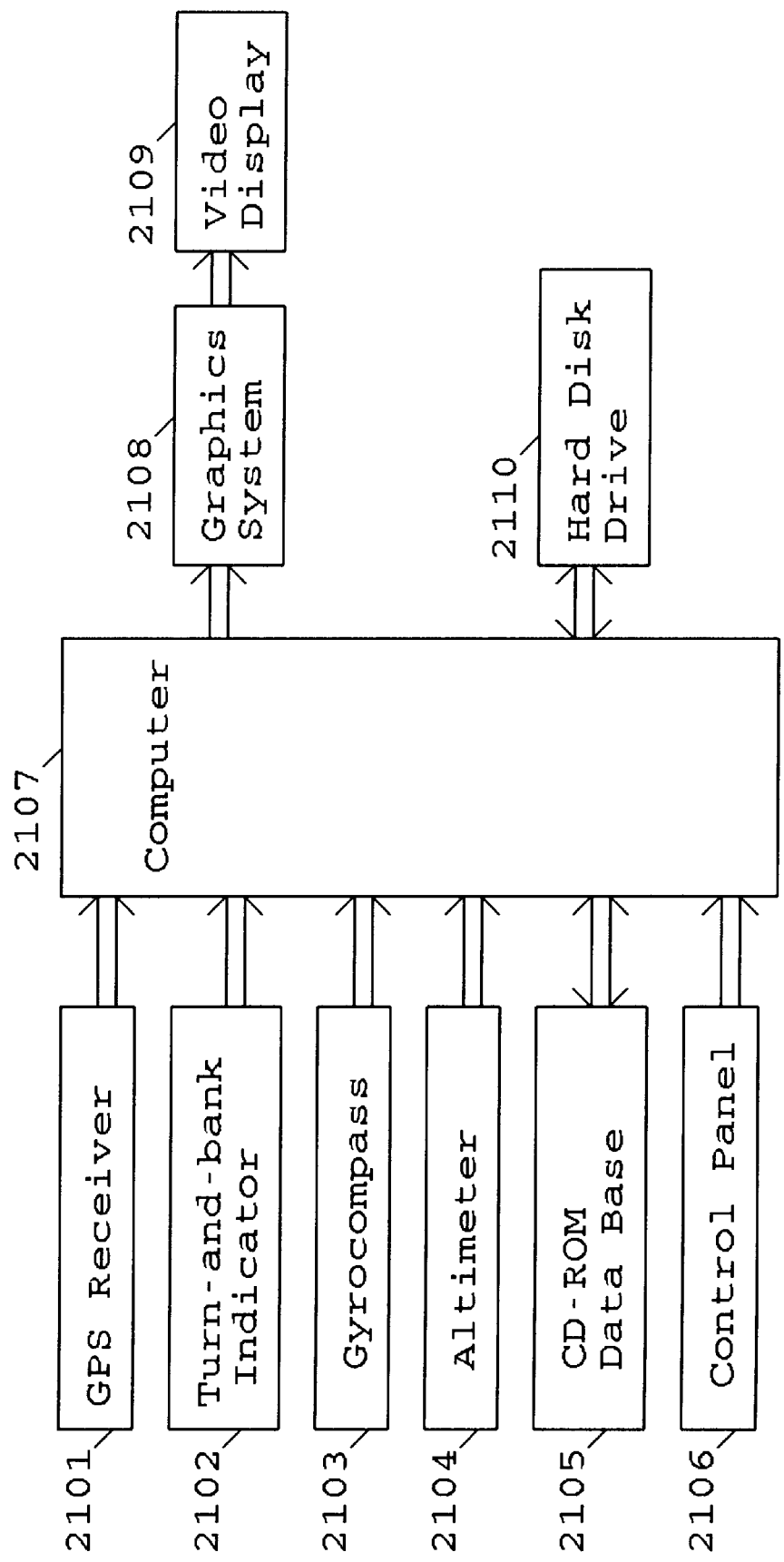
FIG. 21 is a block diagram showing a system used to display a digital map.

FIG. 21 shows an example of how the invention is used. CD ROM Database 2105 contains the data base consisting of three-dimensional polygon data for terrain and manmade structures.

Figure 22:
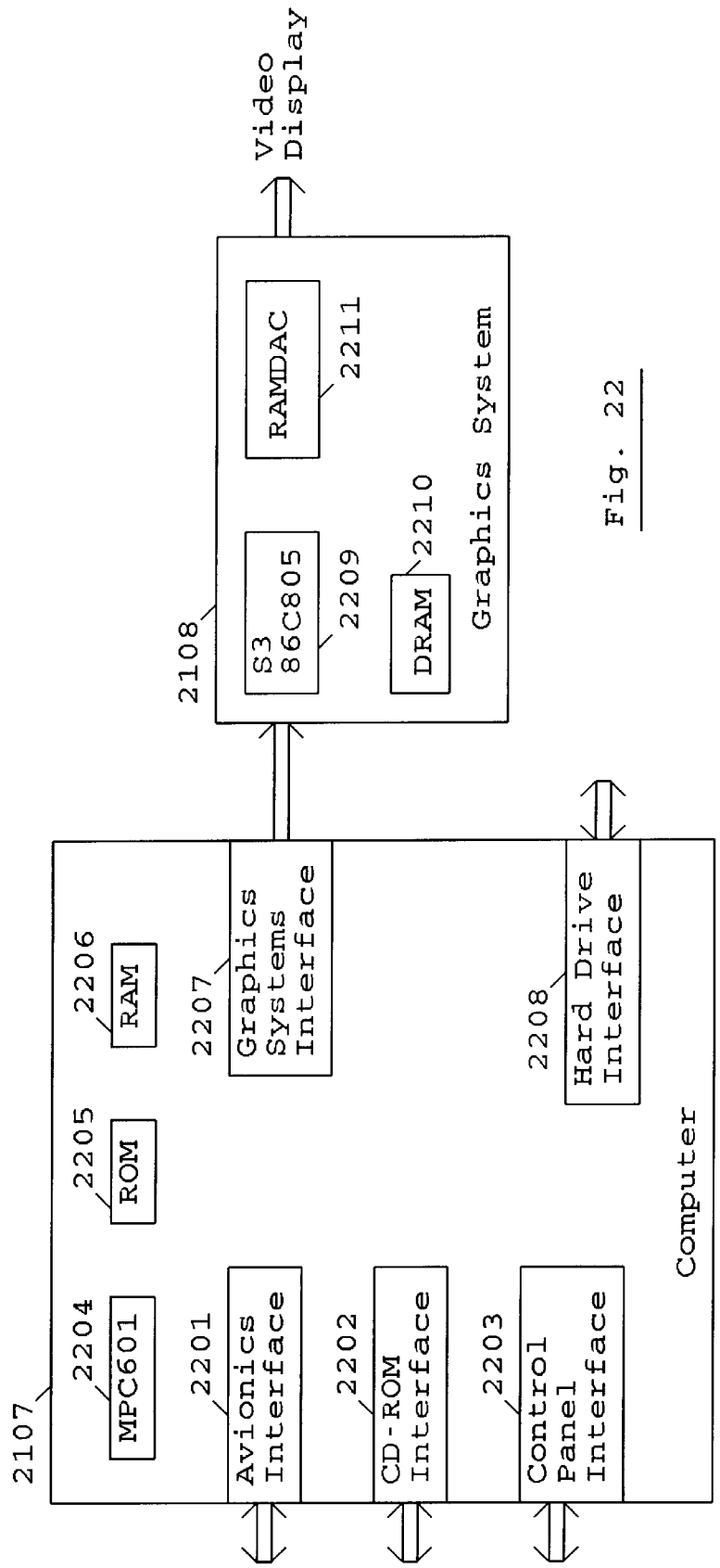
FIG. 22 is a block diagram showing Computer 2107 and Graphics System 2108 in FIG. 21.

Computer 2107 is shown in more detail in FIG. 22 and uses commercially available integrated circuits including processor 2204, the MPC601, from Motorola Semiconductor Inc. The MPC601 is a fast 32-bit RISC processor with a floating point unit and a 32 K Byte eight-way set-associative unified instruction and data cache. Most integer instructions are executed in one clock cycle. Compilers are available for ANSI standard C and for ANSI standard FORTRAN 77. Computer 2107 also contains ROM 2205, RAM 2206, Database Interface 2202, Control Panel Interface 2203 Graphics Systems Interface 2207, Hard Drive Interface 2208, and Avionics Interface 2201. Avionics Interface 2201 interfaces to GPS Receiver 2101, Turn-and-Bank Indicator 2102, Gyrocompass 2103, and Altimeter 2104, all of which are used to determine the user's altitude and orientation. It will be appreciated that numerous different components and system configurations from those illustrated herein may be used in the practice of the present invention.

Computer 2107 uses the user's position to look up the terrain and manmade structure data in CD ROM Database 2105. This data is organized in geographic blocks and is accessed so that there is always the proper data present.

In referring to FIG. 21, Computer 2107 uses the user's position and attitude information to mathematically operate on the terrain and manmade structure data to present three dimensional projected polygons to Graphics System 2108. As shown in FIG. 22, Graphics System 2108 consists of a commercially available graphics integrated circuit 2209, the 86C805, made by S3 Incorporated. This integrated circuit contains primitives for drawing lines in addition to the standard SVGA graphics functions. The 86C805 controls DRAM 2210 which is the video memory consisting of two buffers of 1024×768 pixels, each of which is 8 bits deep. The video to be displayed from DRAM 2210 is sent to RAMDAC 2211 which is an integrated circuit commercially available from several manufacturers, such as Brooktree and AT&T. RAMDAC 2211 contains a small RAM of 256×24 bits and three 8-bit DACs. The RAM section is a color table programmed to assign the desired color to each of the 256 combinations possible by having 8 bits/pixel and is combined with three video DACs, one for each color for Video Display 2109.

Video Display 2109 is a color video display of conventional design such as a standard CRT, an LCD panel, or a plasma display panel. The preferred size of Video Display 2109 is 19" although other sizes may be used.

Hard Disk Drive 2110 is for recording the user's position and orientation data for later playback in order to review the session. Because the information presented on Video Display 2109 is a function of the user's position and orientation data applied to the CD-ROM Database 2105, it can be reconstructed later at any time by storing just the user's position and orientation data and applying it again to CD-ROM Data Base 2105, as long as the data base is still available. The aircraft's position and orientation data requires fewer than 100 bytes. By recording it every 0.1 seconds, an hour requires about 3.6 Megabytes of storage. (100 bytes/update×10 updates/second×60 seconds/min×60 minutes/hour=about 3.6 Megabytes) Therefore, a standard 850 Megabyte hard drive would store about 236 hours of operation.

Control Panel 2106 allows the user to select different operating features. For example, the user can choose the 'look angle' of the display (pan and tilt). Another feature is the zoom function which provides magnification.

As described earlier, the database of the present invention may be used in numerous applications. In addition to being used as a pilot aid during a flight, the database may be used in a flight simulator, functioning substantially as described above, allowing for flight simulation over the mathematically correct three dimensional view of real terrain. Furthermore, the database can be used to review a previous flight by recording the aircraft position and attitude during a flight. The computer 2107 can then use this position and attitude information to mathematically operate on the terrain and man-made structure data to present the three dimensional view as it occurred during the flight. In a similar manner flights can be previewed by using expected position and attitude data.

Additionally, the present invention may be used in the context of a video game. In the prior art, video games have projected views of fictional worlds. Creation of these fictional words is extremely time consuming and labor intensive. The present invention can be used to quickly create three dimensional scenes, with little effort, as the digital elevation model data already exists and may easily be used to create a three dimensional scene as described herein. In this regard, it should be noted that the scene need not be an accurate representation of real terrain. Thus, the data may be altered by, for example, exaggerating the vertical scale, as has been done in some of the accompanying Figures for illustration. Furthermore, the position in x and/or y as well as z may be exaggerated or altered to created interesting views. Additionally, any such exaggeration or alteration may be performed only on selected portions of the data to allow for further variation in the terrain. Of course, the terrain need not be varied, as it may be desirable to create games in which the player has the sense of, for example flying, over real terrain with which the user is familiar. For example, games featuring three dimensional views of the Grand Canyon, mountainous areas, etc. may be of interest. It will be appreciated that because video games typically have limited memory, the present invention is particularly useful in this appalication since the terrain database is significantly reduced in size compared with the digital elevation model data from which it may be derived.

Math Intro

The math for the present invention has been used in the field of coin-operated video games and in traditional computer graphics. However, since it has not been well documented, it will be presented here. These principles are demonstrated in the C computer program in Table 1 in the Appendix to be compiled by Borland Turbo C. The minimum hardware requirements in one embodiment are an IBM/Compatible PC with 1 MB memory and VGA video.

The basic concept of the math assumes the unit is a simulator, responsive to the user's inputs.

The steps required to view a 3D polygon-based data base are:

1. Transformation (translation and rotation as required)
2. Visibility and illumination
3. Clipping
4. Projection In this geometric model there is an absolute Universe filled with Objects, each of which is free to rotate and translate. Associated with each Object is an Orthonormal Matrix (i.e. a set of Orthogonal Unit Vectors) that describes the Object's orientation with respect to the Universe. Because the Unit Vectors are Orthogonal, the Inverse of the matrix is simply the Transpose. This makes it very easy to change the point of reference. The Object may look at the Universe or the Universe may look at the Object. The Object may look at another Object after the appropriate concatenation of Unit Vectors. Each Object will always Roll, Pitch, or Yaw around its own axes regardless of its current orientation without using Euler angle functions.

Rotations

The convention used here is that the Z axis is straight up, the X axis is straight ahead, and the Y axis is to the right. ROLL is a rotation around the X axis, PITCH is a rotation around the Y axis, and YAW is a rotation around the Z axis.

For a simple positive (counter-clockwise) rotation of a point around the origin of a 2-Dimensional space:

$$X'=X*COS(a)-Y*SIN(a)$$

$$Y'=X*SIN(a)+Y*COS(a)$$

Figure 14B:
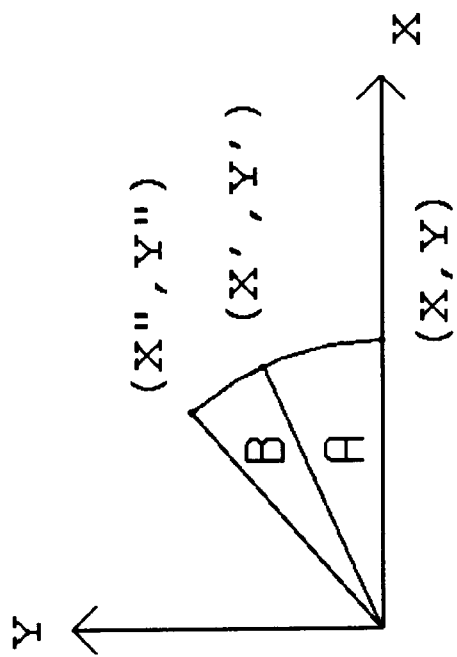
FIG. 14b shows a second positive (counter-clockwise) rotation of a point around the origin of a 2-Dimensional space.
Figure 14A:
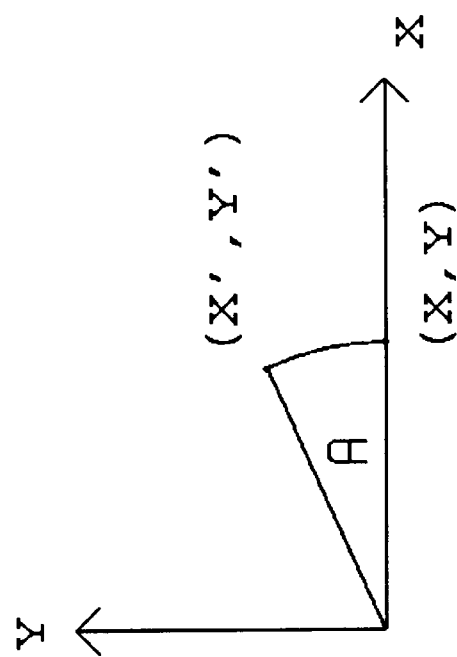
FIG. 14a shows a simple positive (counter-clockwise) rotation of a point around the origin of a 2-Dimensional space.

See FIG. 14a.

If we want to rotate the point again there are two choices:

1. Simply sum the angles and rotate the original points, in which case:

$$X''=X*COS(a+b)-Y*SIN(a+b)$$

$$Y''=X*SIN(a+b)+Y*COS(a+b)$$

2. Rotate X', Y' by angle b:

$$X''=X'*COS(b)-Y'*SIN(b)$$

$$Y''=X'*SIN(b)+Y'*COS(b)$$

See FIG. 14b.

With the second method the errors are cumulative. The first method preserves the accuracy of the original coordinates; unfortunately it works only for rotations around a single axis. When a series of rotations are done together around two or three axes, the order of rotation makes a difference. As an example: An airplane always Rolls, Pitches, and Yaws according to its own axes. Visualize an airplane suspended in air, wings straight and level, nose pointed North. Roll 90 degrees clockwise, then pitch 90 degrees "up". The nose will be pointing East. Now we will start over and reverse the order of rotation. Start from straight and level, pointing North. Pitch up 90 degrees, then Roll 90 degrees clockwise, The nose will now be pointing straight up, where "up" is referenced to the ground. If you have trouble visualizing these motions, just pretend your hand is the airplane.

This means that we cannot simply keep a running sum of the angles for each axis. The standard method is to use functions of Euler angles. The method to be described is easier and faster to use than Euler angle functions.

Figure 15C:
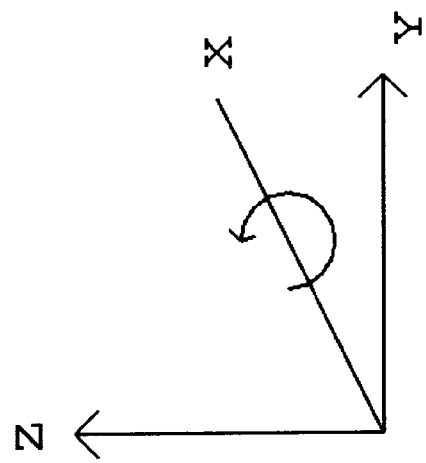
FIG. 15c is a re-orientation of the axes of FIG. 15a showing rotation around the X axis.

Although FIG. 14a represents a two dimensional space, it is equivalent to a three dimensional space where the rotation is around the Z axis. See FIG. 15a. The equations are:

$$X'=X*COS(za)-Y*SIN(za) \qquad \text{Equation 1}$$

$$Y'=X*SIN(za)+Y*COS(za)$$

By symmetry the other equations are:

$$Z'=Z*COS(ya)-X*SIN(ya) \qquad \text{Equation 2}$$

$$X'=Z*SIN(ya)+X*COS(ya)$$

Figure 15B:
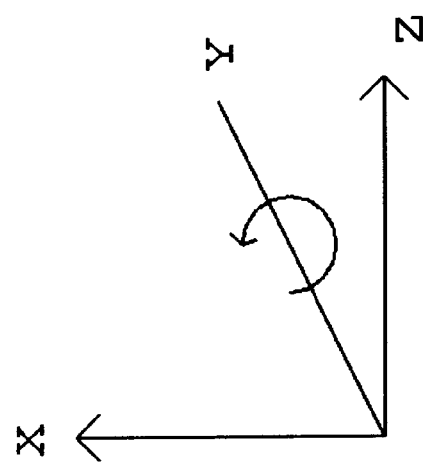
FIG. 15b is a re-orientation of the axes of FIG. 15a showing rotation around the Y axis.
Figure 15A:
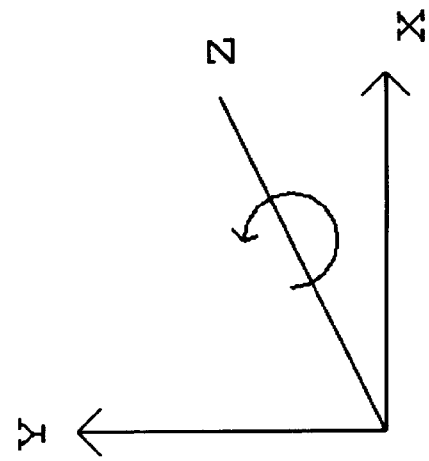
FIG. 15a shows the equivalent three dimensional space of FIG. 14a where the rotation is around the Z axis.
Figure 18B:
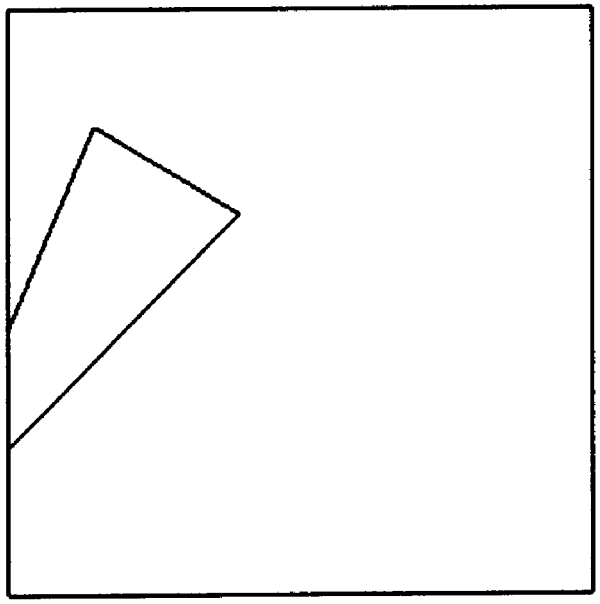
FIG. 18b shows how clipping the polygon in FIG. 18a produces additional sides to the polygon.
Figure 18A:
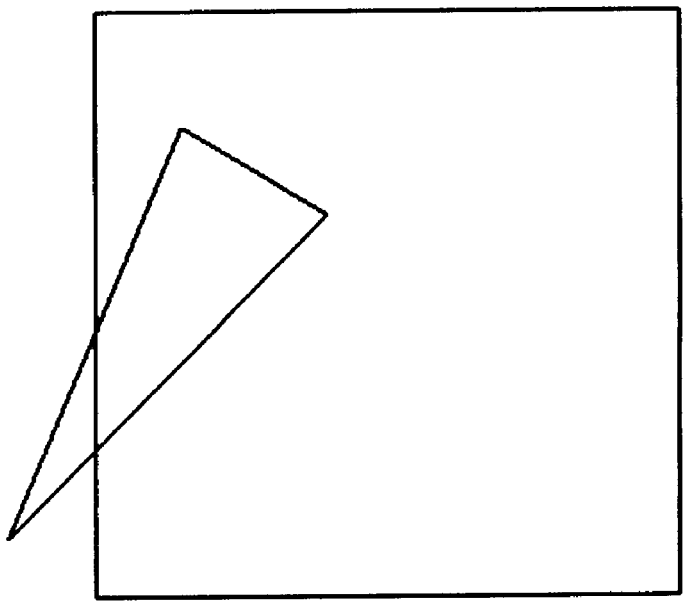
FIG. 18a shows an unclipped polygon.

See FIG. 15b.
and $$Y'=Y*COS(xa)-Z*SIN(xa) \qquad \text{Equation 3}$$

$$Z'=Y*SIN(xa)+Z*COS(xa)$$

See FIG. 15c.

From the ship's frame of reference it is at rest; it is the Universe that is rotating. We can either change the equations to make the angles negative or decide that positive rotations are clockwise. Therefore, from now on all positive rotations are clockwise Consolidating Equations 1, 2, and 3 for a motion consisting of rotations za (around the Z axis), ya (around the Y axis), and xa (around the X axis) yields:

$$X'=X*[COS(ya)*COS(za)] \qquad +$$

$$Y*[-COS(ya)*SIN(za)] \qquad +$$

$$Z*[SIN(ya)]$$

$$Y'=X*[SIN(xa)*SIN(ya)*COS(za)+COS(xa)*SIN(za)] \qquad +$$

$Y*[-SIN(xa)*SIN(ya)*SIN(za)+COS(xa)*COS(za)]$ +

$Z*[-SIN(xa)*COS(ya)]$ $Z'=X*[-COS(xa)*SIN(ya)*COS(za)+SIN(xa)*SIN(za)]$ +

$Y*[COS(xa)*SIN(ya)*SIN(za)+SIN(xa)*COS(za)]$ +

$Z*[COS(xa)*COS(ya)]$ (The asymmetry in the equations is another indication of the difference the order of rotation makes.) The main use of the consolidated equations is to show that any rotation will be in the form:

$$X'=Ax*X+Bx*Y+Cx*Z$$
$$Y'=Ay*X+By*Y+Cy*Z$$
$$Z'=Az*X+Bz*Y+Cz*Z$$

If we start with three specific points in the initial, absolute coordinate system, such as:

$$Px=(1,0,0)$$
$$Py=(0,1,0)$$
$$Pz=(0,0,1)$$

after any number of arbitrary rotations, $$Px'=(XA,YA,ZA)$$
$$Py'=(XB,YB,ZB)$$
$$Pz'=(XC,YC,ZC)$$

By inspection:
   XA=Ax XB=Bx XC=Cx
   YA=Ay YB=By YC=Cy
   ZA=Az ZB=Bz ZC=Cz

Therefore, these three points in the ship's frame of reference provide the coefficients to transform the absolute coordinates of whatever is in the Universe of points. The absolute list of points is itself never changed so it is never lost and errors are not cumulative. All that is required is to calculate Px, Py, and Pz with sufficient accuracy. Px, Py, and Pz can be thought of as the axes of a gyrocompass or 3-axis stabilized platform in the ship that is always oriented in the original, absolute coordinate system.

Translations

Translations do not affect any of the angles and therefore do not affect the rotation coefficients. Translations will be handled as follows:

Rather than keep track of where the origin of the absolute coordinate system is from the ship's point of view (it changes with the ship's orientation), the ship's location will be kept track of in the absolute coordinate system.

To do this requires finding the inverse transformation of the rotation matrix. Px, Py, and Pz are vectors, each with a length of 1.000, and each one orthogonal to the others. (Rotating them will not change these properties.) The inverse of an orthonormal matrix (one composed of orthogonal unit vectors like Px, Py, and Pz) is formed by transposing rows and columns.

Therefore, for X, Y, Z in the Universe's reference and X', Y', Z' in the Ship's reference:

$$\begin{bmatrix} X' \\ Y' \\ Z' \end{bmatrix} = \begin{bmatrix} Ax & Bx & Cx \\ Ay & By & Cy \\ Az & Bz & Cz \end{bmatrix} * \begin{bmatrix} X \\ Y \\ Z \end{bmatrix} \text{ and}$$

$$\begin{bmatrix} X \\ Y \\ Z \end{bmatrix} = \begin{bmatrix} Ax & Ay & Az \\ Bx & By & Bz \\ Cx & Cy & Cz \end{bmatrix} * \begin{bmatrix} X' \\ Y' \\ Z' \end{bmatrix}$$

The ship's X unit vector (1,0,0), the vector which, according to the ship is straight ahead, transforms to (Ax,Bx,Cx). Thus the position of the ship in terms of the Universe's coordinates can be determined. The complete transformation for the Ship to look at the Universe, taking into account the position of the Ship:

For X,Y,Z in Universe reference and X', Y', Z' in Ship's reference $$\begin{bmatrix} X' \\ Y' \\ Z' \end{bmatrix} = \begin{bmatrix} Ax & Bx & Cx \\ Ay & By & Cy \\ Az & Bz & Cz \end{bmatrix} * \begin{bmatrix} X-XT \\ Y-YT \\ Z-ZT \end{bmatrix}$$

Independent Objects

To draw objects in a polygon-based system, rotating the vertices that define the polygon will rotate the polygon.

The object will be defined in its own coordinate system (the object "library") and have associated with it a set of unit vectors. The object is rotated by rotating its unit vectors. The object will also have a position in the absolute Universe.

When we want to look at an object from any frame of reference we will transform each point in the object's library by applying a rotation matrix to place the object in the proper orientation. We will then apply a translation vector to place the object in the proper position. The rotation matrix is derived from both the object's and the observer's unit vectors; the translation vector is derived from the object's position, the observer's position, and the observer's unit vectors.

The simplest frame of reference from which to view an object is in the Universe's reference at (0,0,0) looking along the X axis. The reason is that we already have the rotation coeficients to look at the object. The object's unit vectors supply the matrix coefficients for the object to look at (rotate) the Universe. The inverse of this matrix will allow the Universe to look at (rotate) the object. As discussed previously, the unit vectors form an Orthonormal matrix; its inverse is simply the Transpose. After the object is rotated, it is translated to its position (its position according to the Universe) and projected. Projection is discussed in greater detail below.

A consequence of using the Unit Vector method is that, whatever orientation the object is in, it will always Roll, Pitch, and Yaw according to ITS axes.

For an object with unit vectors:

$$\begin{bmatrix} Ax & Bx & Cx \\ Ay & By & Cy \\ Az & Bz & Cz \end{bmatrix}$$

and absolute position [XT,YT,ZT], and [X,Y,Z] a point from the object's library, and [X',Y',Z'] in the Universe's reference, The Universe looks at the object:

$$\begin{bmatrix} X' \\ Y' \\ Z' \end{bmatrix} = \begin{bmatrix} Ax & Ay & Az \\ Bx & By & Bz \\ Cx & Cy & Cz \end{bmatrix} * \begin{bmatrix} X \\ Y \\ Z \end{bmatrix} + \begin{bmatrix} XT \\ YT \\ ZT \end{bmatrix}$$

For two ships, each with unit vectors and positions:

$$\begin{bmatrix} Ax1 & Bx1 & Cx1 \\ Ay1 & By1 & Cy1 \\ Az1 & Bz1 & Cz1 \end{bmatrix}$$ Ship 1 Unit Vectors $(XT1, YT1, ZT1)$ Ship 1 Position $$\begin{bmatrix} Ax2 & Bx2 & Cx2 \\ Ay2 & By2 & Cy2 \\ Az2 & Bz2 & Cz2 \end{bmatrix}$$ Ship 2 Unit Vectors $(XT2, YT2, ZT2)$ Ship 2 Position $$\begin{bmatrix} Ax2 & Ay2 & Az2 \\ Bx2 & By2 & Bz2 \\ Cx2 & Cy2 & Cz2 \end{bmatrix}$$ Transpose (Inverse) of Ship 2 Unit Vectors (X,Y,Z) in Ship 2 library, (X',Y',Z') in Universe Reference, and (X",Y",Z") in Ship 1 Reference Universe looks at ship 2:

$$\begin{bmatrix} X' \\ Y' \\ Z' \end{bmatrix} = \begin{bmatrix} Ax2 & Ay2 & Az2 \\ Bx2 & By2 & Bz2 \\ Cx2 & Cy2 & Cz2 \end{bmatrix} * \begin{bmatrix} X \\ Y \\ Z \end{bmatrix} + \begin{bmatrix} XT2 \\ YT2 \\ ZT2 \end{bmatrix}$$

Ship 1 looks at the Universe looking at Ship 2:

$$\begin{bmatrix} X'' \\ Y'' \\ Z'' \end{bmatrix} = \begin{bmatrix} Ax1 & Bx1 & Cx1 \\ Ay1 & By1 & Cy1 \\ Az1 & Bz1 & Cz1 \end{bmatrix} * \begin{bmatrix} X' - XT1 \\ Y' - YT1 \\ Z' - ZT1 \end{bmatrix} \quad \text{EQUATION 4}$$

$$= \begin{bmatrix} Ax1 & Bx1 & Cx1 \\ Ay1 & By1 & Cy1 \\ Az1 & Bz1 & Cz1 \end{bmatrix} * \begin{bmatrix} X' \\ Y' \\ Z' \end{bmatrix} - \begin{bmatrix} Ax1 & Bx1 & Cx1 \\ Ay1 & By1 & Cy1 \\ Az1 & Bz1 & Cz1 \end{bmatrix} * \begin{bmatrix} XT1 \\ YT1 \\ ZT1 \end{bmatrix}$$

Expand:

$$\begin{bmatrix} Ax1 & Bx1 & Cx1 \\ Ay1 & By1 & Cy1 \\ Az1 & Bz1 & Cz1 \end{bmatrix} * \begin{bmatrix} X' \\ Y' \\ Z' \end{bmatrix} = \begin{bmatrix} Ax1 & Bx1 & Cx1 \\ Ay1 & By1 & Cy1 \\ Az1 & Bz1 & Cz1 \end{bmatrix} * \left( \begin{bmatrix} Ax2 & Ay2 & Az2 \\ Bx2 & By2 & Bz2 \\ Cx2 & Cy2 & Cz2 \end{bmatrix} * \begin{bmatrix} X \\ Y \\ Z \end{bmatrix} + \begin{bmatrix} XT2 \\ YT2 \\ ZT2 \end{bmatrix} \right)$$

Using the Distributive Law of Matrices:

$$= \begin{bmatrix} Ax1 & Bx1 & Cx1 \\ Ay1 & By1 & Cy1 \\ Az1 & Bz1 & Cz1 \end{bmatrix} * \left( \begin{bmatrix} Ax2 & Ay2 & Az2 \\ Bx2 & By2 & Bz2 \\ Cx2 & Cy2 & Cz2 \end{bmatrix} * \begin{bmatrix} X \\ Y \\ Z \end{bmatrix} \right) + \begin{bmatrix} Ax1 & Bx1 & Cx1 \\ Ay1 & By1 & Cy1 \\ Az1 & Bz1 & Cz1 \end{bmatrix} \begin{bmatrix} XT2 \\ YT2 \\ ZT2 \end{bmatrix}$$

Using the Associative Law of Matrices:

$$= \left( \begin{bmatrix} Ax1 & Bx1 & Cx1 \\ Ay1 & By1 & Cy1 \\ Az1 & Bz1 & Cz1 \end{bmatrix} * \begin{bmatrix} Ax2 & Ay2 & Az2 \\ Bx2 & By2 & Bz2 \\ Cx2 & Cy2 & Cz2 \end{bmatrix} \right) * \begin{bmatrix} X \\ Y \\ Z \end{bmatrix} + \begin{bmatrix} Ax1 & Bx1 & Cx1 \\ Ay1 & By1 & Cy1 \\ Az1 & Bz1 & Cz1 \end{bmatrix} \begin{bmatrix} XT2 \\ YT2 \\ ZT2 \end{bmatrix}$$

Substituting back into Equation 4 gives:

$$\begin{bmatrix} X'' \\ Y'' \\ Z'' \end{bmatrix} = \left( \begin{bmatrix} Ax1 & Bx1 & Cx1 \\ Ay1 & By1 & Cy1 \\ Az1 & Bz1 & Cz1 \end{bmatrix} * \begin{bmatrix} Ax2 & Ay2 & Az2 \\ Bx2 & By2 & Bz2 \\ Cx2 & Cy2 & Cz2 \end{bmatrix} \right) * \begin{bmatrix} X \\ Y \\ Z \end{bmatrix} + \begin{bmatrix} Ax1 & Bx1 & Cx1 \\ Ay1 & By1 & Cy1 \\ Az1 & Bz1 & Cz1 \end{bmatrix} * \begin{bmatrix} XT2 \\ YT2 \\ ZT2 \end{bmatrix} - \begin{bmatrix} Ax1 & Bx1 & Cx1 \\ Ay1 & By1 & Cy1 \\ Az1 & Bz1 & Cz1 \end{bmatrix} * \begin{bmatrix} XT1 \\ YT1 \\ ZT1 \end{bmatrix}$$

Therefore:

$$\begin{bmatrix} X'' \\ Y'' \\ Z'' \end{bmatrix} = \left( \begin{bmatrix} Ax1 & Bx1 & Cx1 \\ Ay1 & By1 & Cy1 \\ Az1 & Bz1 & Cz1 \end{bmatrix} * \begin{bmatrix} Ax2 & Ay2 & Az2 \\ Bx2 & By2 & Bz2 \\ Cx2 & Cy2 & Cz2 \end{bmatrix} \right) * \begin{bmatrix} X \\ Y \\ Z \end{bmatrix} + \begin{bmatrix} Ax1 & Bx1 & Cx1 \\ Ay1 & By1 & Cy1 \\ Az1 & Bz1 & Cz1 \end{bmatrix}$$

Now let:

$$\begin{bmatrix} Ax & Bx & Cx \\ Ay & By & Cy \\ Az & Bz & Cz \end{bmatrix} = \begin{bmatrix} Ax1 & Bx1 & Cx1 \\ Ay1 & By1 & Cy1 \\ Az1 & Bz1 & Cz1 \end{bmatrix} * \begin{bmatrix} Ax2 & Ay2 & Az2 \\ Bx2 & By2 & Bz2 \\ Cx2 & Cy2 & Cz2 \end{bmatrix}$$

This matrix represents the orientation of Ship 2 according to Ship 1's frame of reference. This concatentation needs to be done only once per update of Ship 2.

Also let:

$$\begin{bmatrix} XT \\ YT \\ ZT \end{bmatrix} = \begin{bmatrix} Ax1 & Bx1 & Cx1 \\ Ay1 & By1 & Cy1 \\ Az1 & Bz1 & Cz1 \end{bmatrix} * \begin{bmatrix} XT2 - XT1 \\ YT2 - YT1 \\ ZT2 - ZT1 \end{bmatrix}$$

(XT,YT,ZT) is merely the position of Ship 2 in Ship 1's frame of reference.

This also needs to be done only once per update of Ship 2. Therefore the transformation to be applied to Ship 2's library will be of the form:

$$\begin{bmatrix} X'' \\ Y'' \\ Z'' \end{bmatrix} = \begin{bmatrix} Ax & Bx & Cx \\ Ay & By & Cy \\ Az & Bz & Cz \end{bmatrix} * \begin{bmatrix} X \\ Y \\ Z \end{bmatrix} + \begin{bmatrix} XT \\ YT \\ ZT \end{bmatrix}$$

Therefore, every object has six degrees of freedom, and any object may look at any other object.

Summary of Transformation Algorithms

Define Unit Vectors:

[Px]=(Ax,Ay,Az)

[py]=(Bx,By,Bz)

[Pz]=(Cx,Cy,Cz)

Initialize: Ax=By=Cz=1.000
Ay=Az=Bx=Bz=Cx=Cy=0

If Roll:

$Ay'=Ay*COS(xa)-Az*SIN(xa)$ $Az'=Ay*SIN(xa)+Az*COS(xa)$ $By'=By*COS(xa)-Bz*SIN(xa)$ $Bz'=By*SIN(xa)+Bz*COS(xa)$ $Cy'=Cy*COS(xa)-Cz*SIN(xa)$ $Cz'=Cy*SIN(xa)+Cz*COS(xa)$

If Pitch:

$Az'=Az*COS(ya)-Ax*SIN(ya)$ $Ax'=Az*SIN(ya)+Ax*COS(ya)$ $Bz'=Bz*COS(ya)-Bx*SIN(ya)$ $Bx'=Bz*SIN(ya)+Bx*SIN(ya)$ $Cz'=Cz*COS(ya)-Cx*SIN(ya)$ $Cx'=Cz*SIN(ya)+Cx*COS(ya)$

If Yaw:

$Ax'=Ax*COS(za)-Ay*SIN(za)$ $Ay'=Ax*SIN(za)+Ay*COS(za)$ $Bx'=Bx*COS(za)-By*SIN(za)$ $By'=Bx*SIN(za)+By*COS(za)$ $Cx'=Cx*COS(za)-Cy*SIN(za)$ $Cy'=Cx*SIN(za)+Cy*COS(za)$ ('za', 'ya', and 'xa' are incremental rotations.) The resultant unit vectors form a transformation matrix. For X, Y, Z in Universe reference and X', Y', Z' in Ship's reference $$\begin{bmatrix} X' \\ Y' \\ Z' \end{bmatrix} = \begin{bmatrix} Ax & Bx & Cx \\ Ay & By & Cy \\ Az & Bz & Cz \end{bmatrix} * \begin{bmatrix} X \\ Y \\ Z \end{bmatrix}$$

and $$\begin{bmatrix} X \\ Y \\ Z \end{bmatrix} = \begin{bmatrix} Ax & Ay & Az \\ Bx & By & Bz \\ Cx & Cy & Cz \end{bmatrix} * \begin{bmatrix} X' \\ Y' \\ Z' \end{bmatrix}$$

The ship's x unit vector, the vector which according to the ship is straight ahead, transforms to (Ax,Bx,Cx). For a ship in free space, this is the acceleration vector when there is forward thrust. The sum of the accelerations determine the velocity vector and the sum of the velocity vectors determine the position vector (XT,YT,ZT).

For two ships, each with unit vectors and positions:

$$\begin{bmatrix} Ax1 & Bx1 & Cx1 \\ Ay1 & By1 & Cy1 \\ Az1 & Bz1 & Cz1 \end{bmatrix} \quad \text{Ship 1 Unit Vectors}$$

$(XT1, YT1, ZT1)$ Ship 1 Position $$\begin{bmatrix} Ax2 & Bx2 & Cx2 \\ Ay2 & By2 & Cy2 \\ Az2 & Bz2 & Cz2 \end{bmatrix} \quad \text{Ship 2 Unit Vectors}$$

$(XT2, YT2, ZT2)$ Ship 2 Position

Ship 1 looks at the Universe:

$$\begin{bmatrix} X' \\ Y' \\ Z' \end{bmatrix} = \begin{bmatrix} Ax1 & Bx1 & Cx1 \\ Ay1 & By1 & Cy1 \\ Az1 & Bz1 & Cz1 \end{bmatrix} * \begin{bmatrix} X - XT \\ Y - YT \\ Z - ZT \end{bmatrix}$$

$(X, Y, Z)$ in Universe $(X', Y', Z')$ in Ship 1 frame of reference

Ship 1 looks at Ship 2:

$$\begin{bmatrix} Ax & Bx & Cx \\ Ay & By & Cy \\ Az & Bz & Cz \end{bmatrix} = \begin{bmatrix} Ax1 & Bx1 & Cx1 \\ Ay1 & By1 & Cy1 \\ Az1 & Bz1 & Cz1 \end{bmatrix} * \begin{bmatrix} Ax2 & Ay2 & Az2 \\ Bx2 & By2 & Bz2 \\ Cx2 & Cy2 & Cz2 \end{bmatrix}$$

(Ship 2 orientation relative to Ship 1 orientation)

$$\begin{bmatrix} XT \\ YT \\ ZT \end{bmatrix} = \begin{bmatrix} Ax1 & Bx1 & Cx1 \\ Ay1 & By1 & Cy1 \\ Az1 & Bz1 & Cz1 \end{bmatrix} * \begin{bmatrix} XT2 - XT1 \\ YT2 - YT1 \\ ZT2 - ZT1 \end{bmatrix}$$

(Ship 2 position in Ship 1's frame of reference)

$$\begin{bmatrix} X' \\ Y' \\ Z' \end{bmatrix} = \begin{bmatrix} Ax & Bx & Cx \\ Ay & By & Cy \\ Az & Bz & Cz \end{bmatrix} * \begin{bmatrix} X \\ Y \\ Z \end{bmatrix} + \begin{bmatrix} XT \\ YT \\ ZT \end{bmatrix}$$

$(X, Y, Z)$ in Ship 2 library $(X', Y', Z')$ in Ship 1 reference

Visibility and Illumination

After a polygon is transformed, whether it is a terrain polygon or it belongs to an independently moving object such as another aircraft, the next step is to determine its illumination value, if indeed, it is visible at all.

Associated with each polygon is a vector of length 1 that is normal to the surface of the polygon. This is obtained by using the vector crossproduct between the vectors forming any two adjacent sides of the polygon. For two vectors V1=[xl,yl,zl] and V2=[x2,y2,z2] the crossproduct V1×V2 is the vector [ (y1*z2−y2*z1),−(x1*z2−x2*z1),(x1*y2−x2*y1) ]. The vector is then normalized by dividing it by its length. This gives it a length of 1. This calculation can be done when the data base is generated, becoming part of the data base, or it can be done during program run time. The tradeoff is between data base size and program execution time. In any event, it becomes part of the transformed data.

After the polygon and its normal are transformed to the aircraft's frame of reference, we need to calculate the angle between the polygon's normal and the observers vector. This is done by taking the vector dot product. For two vectors V1=[x1,y1,z1] and V2=[x2,y2,z2], V1 dot V2=length(V1)*length(V2)* cos(a) and is calculated as (x1*x2+y1*y2+z1*z2). Therefore:

$$\cos(a) = \frac{(x1*x2 + y1*y2 + z1*z2)}{\text{length}(V1) * \text{length}(V2)}$$

A cosine that is positive means that the polygon is facing away from the observer. Since it will not be visible it can be rejected and not subjected to further processing. The actual cosine value can be used to determine the brightness of the polygon for added realism. If a point is to be only accepted or rejected the dot product calculation can omit the normalization step since it does not affect the sign of the result.

The observer's vector depends on the type of projection used. For an orthographic projection the dot product is between the user vector P(xt,0,0) and the polygon normal vector. For a perspective projection the dot product is between the user vector P(xt,yt,zt) and the polygon normal vector, where xt, yt, zt are the coordinates of a polygon vertex in the observer's frame of reference.

Clipping

Now that the polygon has been transformed and checked for visibility it must be clipped so that it will properly fit on the screen after it is projected. Standard clipping routines are well known in the computer graphics industry. There are six clipping planes as shown in the 3D representation shown in FIG. 17a. The 2D top view is shown in FIG. 17b, and the 2D side view is shown in FIG. 17c. It should be noted that clipping a polygon may result in the creation of addition polygon sides which must be added to the polygon description sent to the polygon display routine.

Projection

There are two main type of projection. The first type is Perspective, which models the optics of how objects actually look and behave; as objects get farther away they appear to be smaller. As shown in FIG. 16a, X' is the distance to the point along the X axis, Z' is the height of the point, Xs is the distance from the eyepoint to the screen onto which the point is to be projected, and Sy is the vertical displacement on the screen. Z'/X' and Sy/Xs form similar triangles so: Z'/X'=Sy/Xs,therefore Sy=Xs*Z'/X'. Likewise, in FIG. 16b, Y'/X'= Sx/Xs so Sx=Xs*Y'/X' where Sx is the horizontal displacement on the screen. However, we still need to fit Sy and Sx to the monitor display coordinates. Suppose we have a screen that is 1024 by 1024. Each axis would be plus or minus 512 with (0,0) in the center. If we want a 90 degree field of view (which means plus or minus 45 degrees from the center), then when a point has Z'/X'=1 it must be put at the edge of the screen where its value is 512. Therefore Sy=512*Z'/X'. (Sy is the Screen Y-coordinate).

Therefore:

Sy=K*Z'/X' Sy is the vertical coordinate on the display

Sx=K*Y'/X' Sx is the horizontal coordinate on the display K is chosen to make the viewing angle fit the monitor coordinates. If K is varied dynamically we end up with a zoom lens effect.

The second main type of projection is Orthognal, where the projectors are parallel. This is done by ignoring the X distance to the point and mapping Y and Z directly to the display screen. In this case:

Sy=K*Z' Sy is the vertical coordinate on the display

Sx=K*Y' Sx is the horizontal coordinate on the display K is chosen to make the coordinates fit the monitor.

Polygon Edge Enhancement

To prevent a polygon from blending in with its neighbors in a system with a limited number of bits per pixel, polygons can be drawn so that its edges are a different color or shade from its interior. An example of this is shown in FIG. 9.

Thus, a method for generating a database has been described. Although specific embodiments, including specific techniques, routines, etc. have been described, various modifications to the disclosed embodiments will be apparent to one of ordinary skill in the art upon reading this disclosure. Therefore, it is to be understood that such embodiments are merely illustrative of and not restrictive on the broad invention and that this invention is not limited to the specific embodiments shown and described.

What is claimed is:

1. A method for compressing an elevation database, said elevation database comprising digital elevation points of terrain arranged in an array of rows and columns, said method comprising the computer implemented steps of:

selecting every mth column of said elevation database;

selecting every nth row of said elevation database;

determining a center elevation point within a cell bounded by intersections of said mth column and said nth row, wherein m and n are greater than 1, and wherein the elevation of the center elevation point is determined using an elevation of at least one point on a non-selected column or row; and storing a compressed database that represents said cell using data that identifies said center elevation point and said intersections of said mth and nth row creating said cell.

2. The method as described in claim 1 wherein said center elevation point is assigned an elevation value by a method selected from the group consisting of:

a) assigning an elevation value equal to the highest elevation value of said plurality of elevation points in said cell;

b) assigning an elevation value equal to the average elevation value of said plurality of elevation points in said cell;

c) assigning an elevation value equal to the average elevation value of a subset of said plurality of elevation points in said cell proximate said center elevation point; and d) assigning an elevation value equal to the elevation value of the elevation point near said center elevation point.

3. The method as described in claim 1 further comprising defining a plurality of three dimensional polygons in said cell and producing a display of terrain by displaying said plurality of polygons.

4. The method as described in claim 3 wherein said polygons comprise vertices comprising a first said intersection, a second said intersection and said center elevation point.

5. The method as described in claim 3 wherein said cell comprises vertices defined by four said intersections of said mth columns and said nth rows, wherein said plurality of polygons are defined by each adjacent pair of said vertices and said center elevation point.

6. The method as described in claim 1 wherein said database comprises a plurality of geographic blocks, each said geographic block representing a geographic area, wherein a first geographic block may have a different resolution from a second geographic block.

7. The method as described in claim 2 wherein said database comprises a plurality of geographic blocks, each said geographic block representing a geographic area, wherein a first geographic block may have a different resolution from a second geographic block.

8. The method as described in claim 3 wherein said database comprises a plurality of geographic blocks, each said geographic block representing a geographic area, wherein a first geographic block may have a different resolution from a second geographic block, wherein said resolution is varied by using a first value of m and a first value of n in said first geographic block, and a second value of m and a second value of n in said second geographic block, wherein said first value of m is different from said second value of m and/or said first value of n is different from said second value of n.

9. The method as described in claim 3 wherein at least one of said polygons is displayed such that at least one edge of said at least one polygon has a different appearance than a central portion of said at least one polygon.

10. The method as described in claim 1 wherein said database is used to produce a display for a video game.

11. The method as described in claim 5 wherein said database is used to produce a display for a video game.

12. A method of producing a display of terrain comprising the computer implemented steps of:
providing an elevation database, said elevation database comprising digital elevation points of terrain arranged in an array of rows and columns;
defining a cell having a plurality of non-adjacent ones of said digital elevation points as vertices;
calculating a center elevation point for said cell, wherein the elevation of said center elevation point is calculated using certain of said digital elevation points that are not vertices of said cell:
defining a plurality of polygons within said cell, vertices of each of said plurality of polygons being selected from said center elevation point and from said plurality of non-adjacent ones of said digital elevation points; and
displaying said plurality of polygons as three dimensional objects.

13. The method as described in claim 12 wherein said cell is defined by a method comprising:
selecting a plurality of columns;
selecting a plurality of rows;
defining said cell using elevation points at intersections of said plurality of selected columns and plurality of selected rows as vertices of said cell.

14. The method as described in claim 13 wherein said plurality of columns are selected by selecting every mth column and said plurality of rows are selected by selecting every nth row within a region of said terrain, wherein m and n are greater than 1.

15. The method as described in claim 12 wherein said plurality of polygons are defined by:
defining a line from at least one vertex of said cell to said center elevation point.

16. The method as described in claim 13 wherein said plurality of polygons are defined by:
defining a line from at least one vertex of said cell to said center elevation point.

17. The method as described in claim 14 wherein said plurality of polygons are defined by:
defining a line from at least one vertex of said cell to said center elevation point.

18. The method as described in claim 15 wherein said plurality of polygons are defined by:
defining a line from each vertex of said cell to said center elevation point.

19. The method as described in claim 16 wherein said plurality of polygons are defined by:
defining a line from each vertex of said cell to said center elevation point.

20. The method as described in claim 12 wherein said center elevation point is assigned an elevation value by a method selected from the group consisting of:
a) assigning an elevation value equal to the highest elevation value of said plurality of elevation points in said cell;
b) assigning an elevation value equal to the average elevation value of said plurality of elevation points in said cell;
c) assigning an elevation value equal to the average elevation value of a subset of said plurality of elevation points in said cell proximate said center elevation point; and
d) assigning an elevation value equal to the elevation value of the elevation point near said center elevation point.

21. The method as described in claim 12 wherein said database comprises a plurality of geographic blocks, each said geographic block representing a geographic area, wherein a first geographic block may have a different resolution from a second geographic block.

22. The method as described in claim 14 wherein said database comprises a plurality of geographic blocks, each said geographic block representing a geographic area, wherein a first geographic block may have a different resolution from a second geographic block, where said resolution is varied by using a first value of m and a first value of n in said first geographic block, and a second value of m and a second value of n in said second geographic block, wherein said first value of m is different from said second value of m and/or said first value of n is different from said second value of n.

23. The method as described in claim 12 wherein said method is used to display said terrain in a video game.

24. The method as described in claim 17 wherein said method is used to display said terrain in a video game.

25. The method as described in claim 12 wherein at least one of said polygons is displayed such that at least one edge of said at least one polygon has a different appearance than a central portion of said at least one polygon.

26. A machine readable medium having stored thereon sequences of instructions, which when executed by a processor, cause said processor to perform the steps of:

accessing a compressed version of a database storing digital elevation points of terrain arranged in columns and rows, said compressed version having been generated by storing intersections of only certain columns and rows from said database and by calculating and storing a center elevation point relatively in the center of each cell bounded by adjacent ones of the stored intersections, wherein the elevations of said center elevation points are calculated using elevations of digital elevation points that are not on said stored intersections and are not stored as part of said compressed database;

defining a plurality of polygons within each cell using as vertices the center elevation point and the stored intersections for that cell; and displaying said plurality of polygons as three dimensional objects.

27. The machine readable medium of claim 26, wherein said step of defining said plurality of polygons further includes the step of:

defining said plurality of polygons in each cell as non-overlapping triangles having the center elevation point as a vertex.

28. The machine readable medium of claim 26, wherein each center elevation point is equal to the highest of elevation points in the elevation database that fall within the cell containing that center elevation point.

29. The machine readable medium of claim 26, wherein each center elevation point is equal to the average of elevation points in the elevation database that fall within the cell containing that center elevation point.

30. A method of displaying a representation of terrain over which an aircraft is flying, said method comprising the computer implemented steps of:

accessing a compressed version of a database storing digital elevation points of terrain arranged in columns and rows, said compressed version having been generated by storing intersections of only certain columns and rows from said database and by calculating and storing center elevation points relatively in the center of each cell bounded by adjacent ones of the stored intersections, wherein the elevations of said center elevation points are calculated using elevations of digital elevation points that are not on said stored intersections and are not stored as part of said compressed database;

defining a plurality of polygons within each cell using as vertices the center elevation point and the stored intersections for that cell; and displaying said plurality of polygons as three dimensional objects.

31. The method of claim 30, wherein said step of defining said plurality of polygons further includes the steps of:

defining said plurality of polygons in each cell as non-overlapping triangles having the center elevation point as a vertex.

32. The method of claim 30, wherein each center elevation point is equal to the highest of elevation points in the elevation database that fall within the cell containing that center elevation point.

33. The method of claim 30, wherein each center elevation point is equal to the average of elevation points in the elevation database that fall within the cell containing that center elevation point.

* * * * *